(12) United States Patent
Jhang et al.

(10) Patent No.: US 9,851,538 B2
(45) Date of Patent: Dec. 26, 2017

(54) OPTICAL IMAGING LENS

(71) Applicant: GENIUS ELECTRONIC OPTICAL CO., LTD., Taichung (TW)

(72) Inventors: Jia Sin Jhang, Taichung (TW); Guangyun Li, Fujian (CN); Baina Chen, Fujian (CN)

(73) Assignee: GeniuS Electronic Optical (Xiamen) Co., Ltd, Xiamen (CN)

( * ) Notice: Subject to any disclaimer, the term of this patent is extended or adjusted under 35 U.S.C. 154(b) by 0 days.

(21) Appl. No.: 15/176,839

(22) Filed: Jun. 8, 2016

(65) Prior Publication Data
US 2017/0307849 A1    Oct. 26, 2017

(30) Foreign Application Priority Data

Apr. 21, 2016   (CN) .......................... 2016 1 0252412
May 25, 2016   (CN) .......................... 2016 1 0352292

(51) Int. Cl.
| G02B 13/18 | (2006.01) |
| G02B 3/02 | (2006.01) |
| G02B 13/00 | (2006.01) |
| G02B 13/02 | (2006.01) |
| G02B 9/62 | (2006.01) |

(52) U.S. Cl.
CPC .......... *G02B 13/0045* (2013.01); *G02B 9/62* (2013.01); *G02B 13/02* (2013.01)

(58) Field of Classification Search
CPC ...... G02B 13/0045; G02B 9/62; G02B 13/02; G02B 13/18
USPC ......................................... 359/713, 757, 756
See application file for complete search history.

(56) References Cited

U.S. PATENT DOCUMENTS

2015/0253541 A1*  9/2015  Hsu .......................... G02B 9/62
                                                             348/335

\* cited by examiner

*Primary Examiner* — Alicia M Harrington
(74) *Attorney, Agent, or Firm* — Baker & McKenzie LLP

(57) ABSTRACT

Present embodiments provide for an optical imaging lens. The optical imaging lens comprises a first lens element, a second lens element, a third lens element, a fourth lens element, a fifth lens element and a sixth lens element positioned in an order from an object side to an image side. Through controlling the convex or concave shape of the surfaces of the lens elements and designing parameters satisfying at least one inequality, the optical imaging lens shows better optical characteristics and enlarge field angle the total length of the optical imaging lens is shortened.

20 Claims, 36 Drawing Sheets

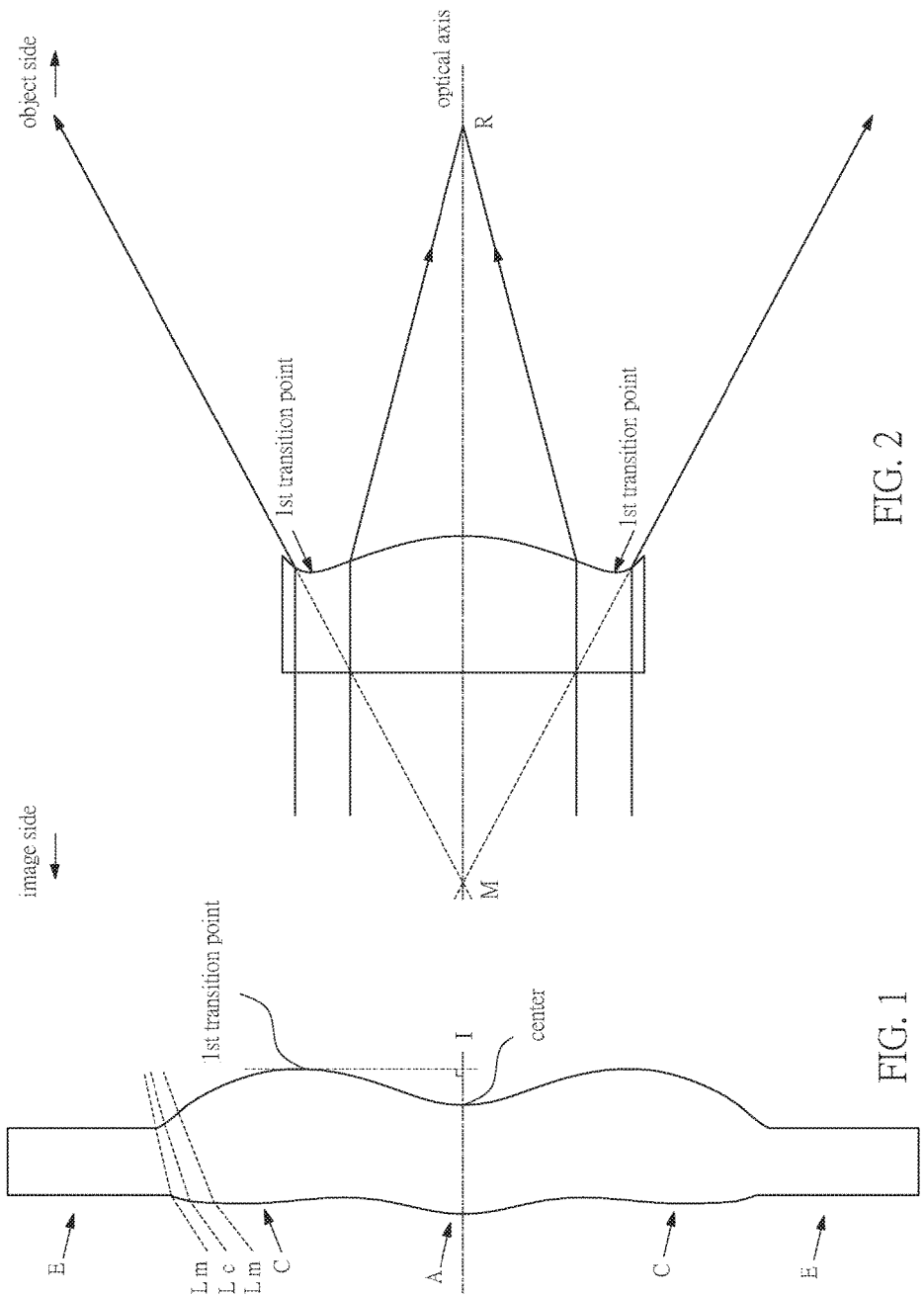

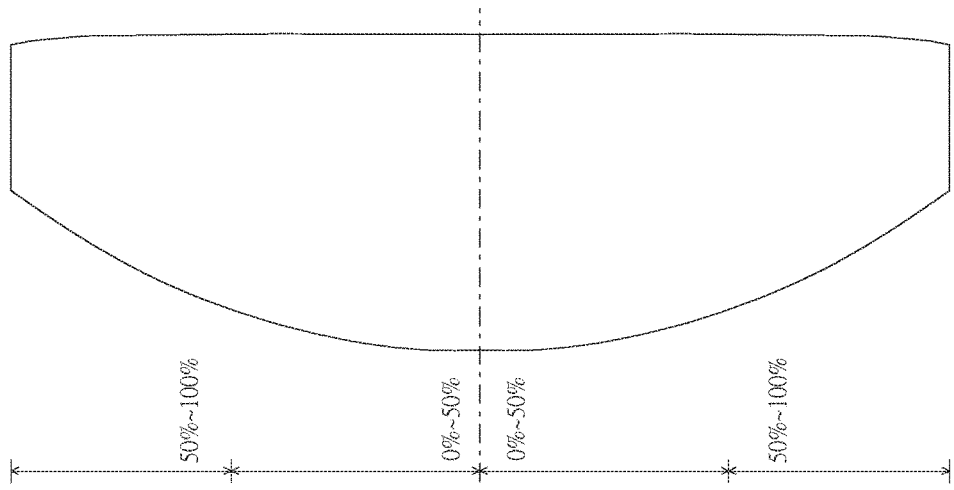
FIG. 3
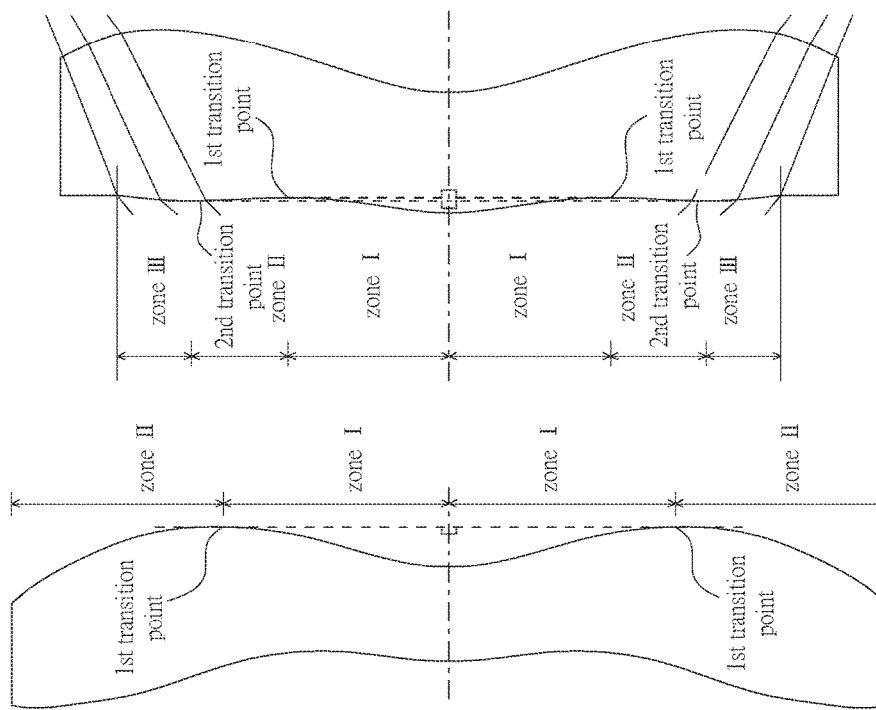
FIG. 4
FIG. 5

| EFL (Effective focus length) = 5.526 mm, HFOV (Half angular field of view) = 24.537deg., TTL (System length) = 5.357mm, Image height = 2.619mm, Fno = 2.062 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 100 | Aperture stop | ∞ | -0.690 | | | | |
| 111 | 1st lens element | 1.581 | 0.837_T1 | 1.545_n1 | 55.987_v1 | 2.948_f1 | plastic |
| 112 | | 71.469 | 0.085_G12 | | | | |
| 121 | 2nd lens element | -5.339 | 0.220_T2 | 1.642_n2 | 22.409_v2 | -4.997_f2 | plastic |
| 122 | | 8.340 | 0.105_G23 | | | | |
| 131 | 3rd lens element | 3.021 | 0.555_T3 | 1.545_n3 | 55.987_v3 | 28.755_f3 | plastic |
| 132 | | 3.497 | 0.393_G34 | | | | |
| 141 | 4th lens element | 17.682 | 0.258_T4 | 1.642_n4 | 22.409_v4 | 298.304_f4 | plastic |
| 142 | | 19.353 | 0.911_G45 | | | | |
| 151 | 5th lens element | -28.222 | 0.324_T5 | 1.545_n5 | 55.987_v5 | -6.790_f5 | plastic |
| 152 | | 4.288 | 0.127_G56 | | | | |
| 161 | 6th lens element | -24.785 | 0.677_T6 | 1.642_n6 | 22.409_v6 | -27.255_f6 | plastic |
| 162 | | 61.883 | 0.400_G6F | | | | |
| 171 | IR cut filter | ∞ | 0.210_TF | | | | |
| 172 | | ∞ | 0.255_GFP | | | | |
| 180 | Image plane | ∞ | 0.000 | | | | |

FIG. 8

| Aspherical parameters | | | | | | |
|---|---|---|---|---|---|---|
| Surface # | 111 | 112 | 121 | 122 | 131 | 132 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | -1.840139E-02 | 1.066799E-02 | 8.270896E-02 | -2.770027E-02 | -1.880471E-01 | -1.409632E-01 |
| $a_6$ | 1.682137E-02 | 3.086331E-02 | 4.312872E-02 | 1.964539E-01 | 2.538718E-01 | 1.663866E-01 |
| $a_8$ | -1.279909E-02 | 4.785032E-03 | -7.457675E-03 | -2.853791E-02 | -3.476796E-02 | -1.034961E-01 |
| $a_{10}$ | 2.492749E-03 | -6.703449E-03 | -9.070554E-03 | -2.725914E-02 | -5.165903E-02 | -7.877876E-03 |
| $a_{12}$ | 0.000000E+00 | 0.000000E+00 | 0.000000E+00 | 0.000000E+00 | 2.239028E-02 | 2.112972E-02 |
| $a_{14}$ | 0.000000E+00 | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 | 0.000000E+00 |
| Surface # | 141 | 142 | 151 | 152 | 161 | 162 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | -1.566803E-01 | -1.569108E-01 | -1.322784E-01 | -1.522401E-01 | -8.747788E-02 | -6.808336E-02 |
| $a_6$ | -4.601132E-02 | 1.193974E-01 | -8.025281E-02 | 1.017997E-02 | 3.916213E-02 | 2.169627E-02 |
| $a_8$ | 5.066949E-02 | -1.538481E-01 | 8.228949E-02 | 1.131566E-02 | -6.553444E-03 | -4.716331E-03 |
| $a_{10}$ | -1.084832E-01 | 9.454089E-02 | -5.110257E-02 | -5.994024E-03 | -1.061055E-03 | 5.741083E-04 |
| $a_{12}$ | 4.348167E-02 | -1.090523E-02 | 6.309534E-03 | -8.388801E-04 | 1.842799E-04 | -5.934984E-06 |
| $a_{14}$ | 0.000000E+00 | 0.000000E+00 | 4.072116E-03 | 8.379861E-04 | 6.527894E-05 | -1.438656E-05 |
| $a_{16}$ | 0.000000E+00 | 0.000000E+00 | -5.783973E-04 | -1.018402E-04 | -9.857913E-06 | 1.567502E-06 |

FIG. 9

| EFL (Effective focus length) = 10.966 mm, HFOV (Half angular field of view) = 14.979deg., TTL (System length) = 10.411 mm, Image height= 2.944 mm, Fno = 2.495 ||||||||
|---|---|---|---|---|---|---|---|
| Surface # | | Radius (mm) | Thickness (mm) | Refractive index | Abbe number | Focus (mm) | Material |
| · | Object | ∞ | ∞ | | | | |
| 200 | Aperture stop | ∞ | -0.810 | | | | |
| 211 | 1st lens element | 3.375 | 1.485_T1 | 1.545_n1 | 55.987_v1 | 7.132_f1 | plastic |
| 212 | | 21.320 | 0.136_G12 | | | | |
| 221 | 2nd lens lement | 10.132 | 0.600_T2 | 1.642_n2 | 22.409_v2 | -8.709_f2 | plastic |
| 222 | | 3.538 | 0.309_G23 | | | | |
| 231 | 3rd lens element | 5.222 | 1.315_T3 | 1.545_n3 | 55.987_v3 | 10.498_f3 | plastic |
| 232 | | 53.156 | 1.599_G34 | | | | |
| 241 | 4th lens element | 4.077 | 0.519_T4 | 1.545_n4 | 55.987_v4 | -13.825_f4 | plastic |
| 242 | | 2.529 | 1.893_G45 | | | | |
| 251 | 5th lens element | -3.265 | 0.780_T5 | 1.642_n5 | 22.409_v5 | 7.875_f5 | plastic |
| 252 | | -2.177 | 0.050_G56 | | | | |
| 261 | 6th lens element | -3.410 | 0.687_T6 | 1.545_n6 | 55.987_v6 | -6.861_f6 | plastic |
| 262 | | -40.522 | 0.400_G6F | | | | |
| 271 | IR cut filter | ∞ | 0.210_TF | | | | |
| 272 | | ∞ | 0.428_GFP | | | | |
| 280 | Image plane | ∞ | 0.000 | | | | |

FIG. 12

| Aspherical parameters | | | | | | |
|---|---|---|---|---|---|---|
| Surface # | 211 | 212 | 221 | 222 | 231 | 232 |
| K | 7.069616E-02 | -9.471044E+01 | -6.638707E+00 | 5.512212E-02 | -1.073984E+00 | -6.086121E+03 |
| $a_2$ | 0.000000E+00 | 0.000000E+00 | 0.000000E+00 | 0.000000E+00 | 0.000000E+00 | 0.000000E+00 |
| $a_4$ | -1.100634E-03 | 6.453374E-03 | 7.666341E-03 | 8.154277E-03 | 4.157355E-04 | -1.524125E-02 |
| $a_6$ | 2.040716E-04 | 9.703748E-04 | -5.183029E-04 | 1.584483E-03 | 3.778501E-03 | 1.499800E-03 |
| $a_8$ | -1.840075E-05 | -1.493996E-04 | -5.364100E-05 | -5.239666E-04 | -6.642707E-04 | -2.626806E-04 |
| $a_{10}$ | 3.822462E-06 | 4.021750E-05 | 8.286990E-06 | 1.946876E-05 | 1.341143E-05 | 7.098151E-06 |
| $a_{12}$ | 4.291183E-07 | 2.577093E-06 | 2.408986E-06 | 3.463506E-06 | 6.291326E-06 | 2.273481E-06 |
| $a_{14}$ | 2.400014E-08 | -1.128638E-07 | 1.732244E-07 | -1.341084E-07 | 8.311166E-07 | -2.456180E-07 |
| $a_{16}$ | -1.686733E-09 | -8.893552E-08 | -1.678496E-07 | -4.760941E-08 | -3.802607E-07 | -1.471572E-07 |
| Surface # | 241 | 242 | 251 | 252 | 261 | 262 |
| K | 1.101741E+00 | -1.012489E+00 | -6.318424E-01 | -6.277704E-01 | 2.889614E-01 | -9.374041E+02 |
| $a_2$ | 0.000000E+00 | 0.000000E+00 | 0.000000E+00 | 0.000000E+00 | 0.000000E+00 | 0.000000E+00 |
| $a_4$ | -8.431179E-02 | -6.832711E-02 | 3.183458E-02 | 4.744953E-02 | -3.625751E-02 | -7.996497E-02 |
| $a_6$ | 3.200037E-03 | 6.735099E-03 | -1.174618E-02 | -1.643209E-02 | 9.694862E-03 | 2.369231E-02 |
| $a_8$ | -6.269683E-04 | 1.925700E-03 | 1.015643E-03 | 1.887580E-03 | -5.794174E-04 | -3.357190E-03 |
| $a_{10}$ | 1.042034E-03 | -2.768190E-04 | -1.302389E-04 | 1.130790E-06 | 5.180500E-06 | 1.864881E-04 |
| $a_{12}$ | -6.499125E-05 | -2.246475E-05 | 1.644631E-05 | -7.285087E-06 | 4.844518E-07 | 8.832279E-07 |
| $a_{14}$ | -7.745517E-05 | 1.395834E-05 | 2.635332E-06 | -1.409121E-06 | 4.737045E-08 | -1.705918E-07 |
| $a_{16}$ | 1.145733E-05 | -2.069209E-06 | -2.834310E-07 | 2.025119E-07 | -1.183766E-09 | -1.324733E-08 |

FIG. 13

| \multicolumn{7}{l}{EFL (Effective focus length) = 10.898 mm, HFOV (Half angular field of view) = 15.011deg., TTL (System length) = 9.960 mm, Image height= 2.944 mm, Fno = 2.491} |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 300 | Aperture stop | ∞ | -0.846 | | | | |
| 311 | 1st lens element | 3.015 | 1.525_T1 | 1.545_n1 | 55.987_v1 | 7.050_f1 | plastic |
| 312 | | 11.409 | 0.130_G12 | | | | |
| 321 | 2nd lens lement | 11.143 | 0.279_T2 | 1.642_n2 | 22.409_v2 | -8.528_f2 | plastic |
| 322 | | 3.655 | 0.088_G23 | | | | |
| 331 | 3rd lens element | 3.475 | 1.346_T3 | 1.545_n3 | 55.987_v3 | 8.931_f3 | plastic |
| 332 | | 10.420 | 1.107_G34 | | | | |
| 341 | 4th lens element | -4.281 | 0.295_T4 | 1.545_n4 | 55.987_v4 | -13.266_f4 | plastic |
| 342 | | -10.714 | 2.232_G45 | | | | |
| 351 | 5th lens element | 8.134 | 0.454_T5 | 1.545_n5 | 55.987_v5 | -7.529_f5 | plastic |
| 352 | | 2.678 | 0.364_G56 | | | | |
| 361 | 6th lens element | 225.188 | 0.982_T6 | 1.642_n6 | 22.409_v6 | 10.301_f6 | plastic |
| 362 | | -6.860 | 0.400_G6F | | | | |
| 371 | IR cut filter | ∞ | 0.210_TF | | | | |
| 372 | | ∞ | 0.547_GFP | | | | |
| 380 | Image plane | ∞ | 0.000 | | | | |

FIG. 16

| Aspherical parameters | | | | | | |
|---|---|---|---|---|---|---|
| Surface # | 311 | 312 | 321 | 322 | 331 | 332 |
| K | 2.002385E-02 | -6.684021E+00 | -2.769810E-01 | 1.585716E-01 | 1.023803E-02 | -3.911352E+00 |
| $a_2$ | 0.000000E+00 | 0.000000E+00 | 0.000000E+00 | 0.000000E+00 | 0.000000E+00 | 0.000000E+00 |
| $a_4$ | -9.186064E-04 | 5.604841E-03 | 1.208172E-02 | 4.057976E-03 | -1.028393E-02 | -1.823686E-02 |
| $a_6$ | 1.289803E-04 | 2.452342E-03 | -3.317554E-04 | 7.806644E-03 | 1.155542E-02 | 5.739601E-04 |
| $a_8$ | 1.550686E-05 | -2.234967E-04 | -1.557439E-04 | -1.455409E-03 | -1.748418E-03 | -1.657354E-04 |
| $a_{10}$ | -6.235886E-07 | 1.337938E-05 | 3.607882E-06 | 1.092727E-06 | -4.600545E-06 | -8.108655E-06 |
| $a_{12}$ | -1.975338E-08 | 1.167377E-06 | 6.022805E-07 | 2.478762E-07 | 1.075934E-06 | 1.220990E-06 |
| $a_{14}$ | 1.263661E-08 | -1.109085E-07 | -7.355027E-08 | 2.235548E-07 | 3.849189E-07 | 4.412900E-07 |
| $a_{16}$ | 2.266862E-09 | -5.808262E-08 | -9.938567E-08 | 1.293067E-07 | 5.185783E-08 | -2.518681E-08 |
| Surface # | 341 | 342 | 351 | 352 | 361 | 362 |
| K | 2.525549E-01 | 2.379992E+01 | -3.716784E+01 | -5.169136E+00 | 4.673201E+02 | -6.447617E+01 |
| $a_2$ | 0.000000E+00 | 0.000000E+00 | 0.000000E+00 | 0.000000E+00 | 0.000000E+00 | 0.000000E+00 |
| $a_4$ | -4.474486E-02 | -1.210665E-02 | -4.627550E-02 | -3.669244E-02 | -2.845603E-02 | -5.767887E-02 |
| $a_6$ | 2.689616E-02 | 2.680820E-02 | 8.336375E-03 | 4.668156E-03 | 8.096437E-03 | 1.687728E-02 |
| $a_8$ | -7.073676E-03 | -4.838985E-03 | -4.421903E-04 | -2.224014E-04 | -9.115226E-04 | -2.055561E-03 |
| $a_{10}$ | 3.766993E-04 | 7.742201E-05 | -2.233622E-07 | 2.452197E-06 | 3.350800E-05 | 9.359309E-05 |
| $a_{12}$ | 4.709367E-05 | 8.824583E-05 | -2.771868E-08 | -6.397351E-08 | -2.731411E-07 | 2.307853E-08 |
| $a_{14}$ | -9.425715E-07 | 1.594264E-05 | 2.861955E-09 | -4.378639E-08 | 4.274933E-09 | -1.821945E-08 |
| $a_{16}$ | 7.958831E-07 | -6.851522E-06 | -3.885848E-09 | -4.932641E-09 | 2.856850E-10 | -3.640522E-09 |

FIG. 17

| EFL (Effective focus length) = 10.955 mm, HFOV (Half angular field of view) = 14.951deg., TTL (System length) = 9.706 mm, Image height= 2.944 mm, Fno = 2.491 |||||||

| Surface # | | Radius (mm) | Thickness (mm) | Refractive index | Abbe number | Focus (mm) | Material |
|---|---|---|---|---|---|---|---|
| - | Object | ∞ | ∞ | | | | |
| 400 | Aperture stop | ∞ | -0.874 | | | | |
| 411 | 1st lens element | 2.974 | 1.414_T1 | 1.545_n1 | 55.987_v1 | 6.528_f1 | plastic |
| 412 | | 14.891 | 0.054_G12 | | | | |
| 421 | 2nd lens element | 8.318 | 0.248_T2 | 1.642_n2 | 22.409_v2 | -8.695_f2 | plastic |
| 422 | | 3.318 | 0.237_G23 | | | | |
| 431 | 3rd lens element | 3.887 | 1.301_T3 | 1.545_n3 | 55.987_v3 | 9.645_f3 | plastic |
| 432 | | 13.067 | 1.487_G34 | | | | |
| 441 | 4th lens element | -38.064 | 0.299_T4 | 1.545_n4 | 55.987_v4 | -9.516_f4 | plastic |
| 442 | | 6.037 | 1.980_G45 | | | | |
| 451 | 5th lens element | -3.686 | 0.821_T5 | 1.642_n5 | 22.409_v5 | 9.000_f5 | plastic |
| 452 | | -2.455 | 0.151_G56 | | | | |
| 461 | 6th lens element | -3.319 | 0.674_T6 | 1.545_n6 | 55.987_v6 | -6.760_f6 | plastic |
| 462 | | -35.153 | 0.400_G6F | | | | |
| 471 | IR cut filter | ∞ | 0.210_TF | | | | |
| 472 | | ∞ | 0.431_GFP | | | | |
| 480 | Image plane | ∞ | 0.000 | | | | |

FIG. 20

| Aspherical parameters | | | | | | |
|---|---|---|---|---|---|---|
| Surface # | 411 | 412 | 421 | 422 | 431 | 432 |
| K | 2.241618E-02 | -1.276728E+01 | -5.075550E-04 | 1.149343E-01 | -2.045369E-01 | -2.447286E+00 |
| $a_2$ | 0.000000E+00 | 0.000000E+00 | 0.000000E+00 | 0.000000E+00 | 0.000000E+00 | 0.000000E+00 |
| $a_4$ | -1.190865E-03 | 8.873688E-03 | 8.588307E-03 | 6.727233E-03 | 3.440854E-03 | -1.213909E-02 |
| $a_6$ | 3.429565E-04 | 1.311764E-03 | -7.199562E-04 | 2.342957E-03 | 4.088723E-03 | 8.414373E-04 |
| $a_8$ | -1.916041E-05 | -2.364992E-04 | -8.264523E-05 | -5.415275E-04 | -7.247367E-04 | -4.101025E-04 |
| $a_{10}$ | 1.516397E-06 | 1.445054E-05 | 6.012038E-06 | 8.884401E-06 | -1.410557E-05 | -1.756721E-05 |
| $a_{12}$ | 1.132953E-08 | 2.021631E-06 | 1.397902E-06 | 2.176517E-06 | -1.354147E-06 | 5.468565E-06 |
| $a_{14}$ | 3.616399E-09 | 4.559603E-08 | 1.412035E-07 | 5.421009E-07 | 9.367082E-08 | 1.134377E-06 |
| $a_{16}$ | 1.161367E-08 | -4.561897E-08 | -7.706856E-08 | 2.235761E-07 | 1.191982E-07 | -2.154613E-07 |
| Surface # | 441 | 442 | 451 | 452 | 461 | 462 |
| K | 4.383018E+02 | -2.082735E+01 | -5.745775E-01 | -2.603224E-01 | -3.054855E-02 | -1.513841E+03 |
| $a_2$ | 0.000000E+00 | 0.000000E+00 | 0.000000E+00 | 0.000000E+00 | 0.000000E+00 | 0.000000E+00 |
| $a_4$ | -8.437825E-02 | -4.726540E-02 | 3.398450E-02 | 5.662959E-02 | -3.824276E-02 | -9.763775E-02 |
| $a_6$ | 1.515325E-02 | 1.615912E-02 | -1.286998E-02 | -1.849444E-02 | 9.934355E-03 | 2.818712E-02 |
| $a_8$ | -1.726439E-03 | -2.243680E-04 | 1.215266E-03 | 2.103261E-03 | -5.605325E-04 | -3.572045E-03 |
| $a_{10}$ | 5.217384E-04 | -1.423496E-04 | -4.136252E-05 | -1.624191E-05 | 4.313311E-06 | 1.621649E-04 |
| $a_{12}$ | -1.421762E-06 | 1.608100E-05 | -5.336593E-06 | -2.186852E-06 | -6.371578E-08 | 5.780484E-07 |
| $a_{14}$ | -2.804130E-05 | 1.833143E-05 | -1.078299E-07 | -2.213534E-07 | 6.680052E-09 | 3.702996E-09 |
| $a_{16}$ | 5.797375E-06 | -1.493630E-06 | 2.727263E-07 | -5.079295E-09 | 3.790685E-09 | -8.055426E-09 |

FIG. 21

| EFL (Effective focus length) = 10.938 mm, HFOV (Half angular field of view) = 14.994deg., TTL (System length) = 10.943 mm, Image height= 2.944 mm, Fno = 2.493 |||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 500 | Aperture stop | ∞ | -0.714 | | | | |
| 511 | 1st lens element | 3.560 | 1.712_T1 | 1.545_n1 | 55.987_v1 | 8.680_f1 | plastic |
| 512 | | 11.856 | 0.085_G12 | | | | |
| 521 | 2nd lens lement | 16.242 | 0.515_T2 | 1.642_n2 | 22.409_v2 | -9.354_f2 | plastic |
| 522 | | 4.356 | 0.844_G23 | | | | |
| 531 | 3rd lens element | 4.183 | 1.481_T3 | 1.545_n3 | 55.987_v3 | 7.040_f3 | plastic |
| 532 | | -41.737 | 1.665_G34 | | | | |
| 541 | 4th lens element | -27.129 | 0.727_T4 | 1.545_n4 | 55.987_v4 | -10.771_f4 | plastic |
| 542 | | 7.584 | 1.403_G45 | | | | |
| 551 | 5th lens element | -2.885 | 0.335_T5 | 1.642_n5 | 22.409_v5 | 39.518_f5 | plastic |
| 552 | | -2.711 | 0.148_G56 | | | | |
| 561 | 6th lens element | -3.115 | 0.714_T6 | 1.545_n6 | 55.987_v6 | -15.366_f6 | plastic |
| 562 | | -5.354 | 0.400_G6F | | | | |
| 571 | IR cut filter | ∞ | 0.210_TF | | | | |
| 572 | | ∞ | 0.703_GFP | | | | |
| 580 | Image plane | ∞ | 0.000 | | | | |

FIG. 24

| Aspherical parameters | | | | | | |
|---|---|---|---|---|---|---|
| Surface # | 511 | 512 | 521 | 522 | 531 | 532 |
| K | -2.638829E-02 | -5.580034E+01 | -2.103507E+00 | 2.859858E-01 | -2.023955E+00 | 5.857375E+01 |
| $a_2$ | 0.000000E+00 | 0.000000E+00 | 0.000000E+00 | 0.000000E+00 | 0.000000E+00 | 0.000000E+00 |
| $a_4$ | -1.610503E-03 | 4.268386E-03 | 7.885429E-03 | 8.256191E-03 | 3.787138E-04 | -1.375477E-02 |
| $a_6$ | 2.587550E-04 | 3.420828E-04 | -5.065401E-04 | 2.152460E-03 | 2.769348E-03 | 1.937896E-03 |
| $a_8$ | -5.125125E-05 | -1.936730E-04 | -1.106518E-04 | -7.023774E-04 | -5.562432E-04 | -2.201807E-04 |
| $a_{10}$ | -3.337312E-07 | 3.355371E-05 | -5.892865E-06 | -1.883822E-05 | 2.551855E-05 | -5.117090E-06 |
| $a_{12}$ | 7.229033E-07 | 3.543726E-06 | 6.952135E-07 | 8.324557E-07 | 1.553289E-06 | 1.343594E-06 |
| $a_{14}$ | 1.270746E-07 | -2.286576E-07 | 2.804056E-07 | 9.581450E-07 | -9.865798E-08 | 4.776336E-07 |
| $a_{16}$ | -1.676594E-08 | -1.538870E-07 | -9.812996E-08 | 8.384760E-08 | -2.285298E-08 | -7.577602E-08 |
| Surface # | 541 | 542 | 551 | 552 | 561 | 562 |
| K | 1.851088E+02 | 4.356212E+00 | -2.198480E+00 | -1.825533E-01 | -8.510744E-02 | -3.319423E+01 |
| $a_2$ | 0.000000E+00 | 0.000000E+00 | 0.000000E+00 | 0.000000E+00 | 0.000000E+00 | 0.000000E+00 |
| $a_4$ | -6.466221E-02 | -5.077964E-02 | 2.620439E-02 | 4.584926E-02 | -3.764114E-02 | -8.006888E-02 |
| $a_6$ | 8.869211E-03 | 1.100821E-02 | -1.428271E-02 | -1.923587E-02 | 1.020525E-02 | 2.464086E-02 |
| $a_8$ | -1.788146E-03 | -7.492722E-04 | 1.172728E-03 | 2.207749E-03 | -5.417786E-04 | -3.465018E-03 |
| $a_{10}$ | 6.616362E-04 | 5.270748E-06 | -8.253899E-06 | 5.230428E-06 | 9.175498E-06 | 1.794924E-04 |
| $a_{12}$ | 3.191391E-05 | 3.488057E-06 | 1.362191E-06 | -6.653672E-07 | 5.602914E-07 | 1.421953E-06 |
| $a_{14}$ | -3.985998E-05 | 1.642885E-05 | 8.964487E-07 | -9.326238E-08 | -4.493273E-09 | -2.669384E-08 |
| $a_{16}$ | 4.148230E-06 | -2.929989E-06 | 2.962754E-07 | 3.680216E-08 | -1.306348E-08 | -2.487470E-08 |

FIG. 25

| EFL (Effective focus length) = 10.984 mm, HFOV (Half angular field of view) = 14.890deg., TTL (System length) = 9.846 mm, Image height= 2.944 mm, Fno = 2.492 |||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 600 | Aperture stop | ∞ | -0.850 | | | | |
| 611 | 1st lens element | 2.871 | 1.387_T1 | 1.545_n1 | 55.987_v1 | 5.686_f1 | plastic |
| 612 | | 31.408 | 0.065_G12 | | | | |
| 621 | 2nd lens lement | 8.139 | 0.250_T2 | 1.642_n2 | 22.409_v2 | -8.540_f2 | plastic |
| 622 | | 3.252 | 0.829_G23 | | | | |
| 631 | 3rd lens element | 3.770 | 0.778_T3 | 1.545_n3 | 55.987_v3 | 17.679_f3 | plastic |
| 632 | | 5.734 | 1.219_G34 | | | | |
| 641 | 4th lens element | 4.829 | 0.477_T4 | 1.545_n4 | 55.987_v4 | -13.072_f4 | plastic |
| 642 | | 2.780 | 2.302_G45 | | | | |
| 651 | 5th lens element | -3.461 | 0.764_T5 | 1.642_n5 | 22.409_v5 | 7.428_f5 | plastic |
| 652 | | -2.187 | 0.096_G56 | | | | |
| 661 | 6th lens element | -3.523 | 0.778_T6 | 1.545_n6 | 55.987_v6 | -5.980_f6 | plastic |
| 662 | | 48.503 | 0.400_G6F | | | | |
| 671 | IR cut filter | ∞ | 0.210_TF | | | | |
| 672 | | ∞ | 0.290_GFP | | | | |
| 680 | Image plane | ∞ | 0.000 | | | | |

FIG. 28

| | Aspherical parameters | | | | | |
|---|---|---|---|---|---|---|
| Surface # | 611 | 612 | 621 | 622 | 631 | 632 |
| K | 1.274799E-02 | -3.062467E+02 | -1.246180E+00 | 2.044579E-01 | -7.600463E-01 | -5.278987E+00 |
| $a_2$ | 0.000000E+00 | 0.000000E+00 | 0.000000E+00 | 0.000000E+00 | 0.000000E+00 | 0.000000E+00 |
| $a_4$ | -9.815467E-04 | 6.294153E-03 | 8.154422E-03 | 8.050045E-03 | 1.461747E-03 | -1.444636E-02 |
| $a_6$ | 2.201930E-04 | 8.869930E-04 | -5.164285E-04 | 1.474724E-03 | 3.636137E-03 | 3.555318E-03 |
| $a_8$ | -2.272299E-05 | -2.215231E-04 | -6.160782E-05 | -5.533226E-04 | -6.680075E-04 | -4.790384E-04 |
| $a_{10}$ | 3.274767E-06 | 1.502058E-05 | 8.254669E-06 | 5.307469E-05 | -1.828264E-05 | -9.041502E-05 |
| $a_{12}$ | -1.001754E-07 | 1.514655E-06 | 7.274293E-07 | 1.599425E-05 | 3.768702E-06 | 8.888675E-06 |
| $a_{14}$ | -4.128149E-08 | -3.262607E-08 | 4.768542E-07 | -1.882787E-08 | 3.915957E-06 | 8.984621E-06 |
| $a_{16}$ | 7.059839E-09 | -5.967630E-08 | -1.589311E-07 | -2.046443E-07 | 6.625928E-07 | 1.468891E-06 |
| Surface # | 641 | 642 | 651 | 652 | 661 | 662 |
| K | -4.965346E+00 | -4.084050E+00 | -1.395229E+00 | -4.369377E-01 | 6.810912E-02 | 2.027778E+02 |
| $a_2$ | 0.000000E+00 | 0.000000E+00 | 0.000000E+00 | 0.000000E+00 | 0.000000E+00 | 0.000000E+00 |
| $a_4$ | -7.901623E-02 | -4.799280E-02 | 3.739906E-02 | 6.278423E-02 | -3.725950E-02 | -9.827595E-02 |
| $a_6$ | 7.291019E-03 | 1.112194E-02 | -1.317958E-02 | -1.832896E-02 | 9.787923E-03 | 2.803467E-02 |
| $a_8$ | -1.258144E-03 | -5.481568E-04 | 1.109842E-03 | 2.005275E-03 | -5.621760E-04 | -3.560461E-03 |
| $a_{10}$ | 8.049206E-04 | 9.290206E-05 | -4.043592E-05 | -2.313969E-05 | 4.419541E-06 | 1.656085E-04 |
| $a_{12}$ | 7.316862E-05 | 1.140666E-04 | -4.687390E-06 | -2.697672E-06 | 1.662010E-08 | 6.013124E-07 |
| $a_{14}$ | -1.107378E-05 | 4.778199E-06 | 2.098898E-07 | -1.888121E-07 | 1.534992E-08 | 4.783010E-10 |
| $a_{16}$ | -9.127749E-06 | -8.136966E-06 | 1.995147E-07 | 2.268627E-08 | 2.892985E-09 | -1.027583E-08 |

FIG. 29

| EFL (Effective focus length) = 10.973 mm, HFOV (Half angular field of view) = 14.922deg., TTL (System length) = 10.053 mm, Image height= 2.944 mm, Fno = 2.491 |||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 700 | Aperture stop | ∞ | -0.994 | | | | |
| 711 | 1st lens element | 2.910 | 1.559_T1 | 1.545_n1 | 55.987_v1 | 5.950_f1 | plastic |
| 712 | | 22.515 | 0.147_G12 | | | | |
| 721 | 2nd lens lement | 6.267 | 0.240_T2 | 1.642_n2 | 22.409_v2 | -7.923_f2 | plastic |
| 722 | | 2.778 | 0.364_G23 | | | | |
| 731 | 3rd lens element | 3.893 | 1.148_T3 | 1.545_n3 | 55.987_v3 | 11.403_f3 | plastic |
| 732 | | 9.296 | 0.956_G34 | | | | |
| 741 | 4th lens element | -19.894 | 1.334_T4 | 1.545_n4 | 55.987_v4 | -8.731_f4 | plastic |
| 742 | | 6.422 | 1.765_G45 | | | | |
| 751 | 5th lens element | -4.627 | 0.745_T5 | 1.642_n5 | 22.409_v5 | 7.310_f5 | plastic |
| 752 | | -2.487 | 0.136_G56 | | | | |
| 761 | 6th lens element | -3.656 | 0.741_T6 | 1.545_n6 | 55.987_v6 | -5.817_f6 | plastic |
| 762 | | 26.011 | 0.400_G6F | | | | |
| 771 | IR cut filter | ∞ | 0.210_TF | | | | |
| 772 | | ∞ | 0.307_GFP | | | | |
| 780 | Image plane | ∞ | 0.000 | | | | |

FIG. 32

| Aspherical parameters | | | | | | |
|---|---|---|---|---|---|---|
| Surface # | 711 | 712 | 721 | 722 | 731 | 732 |
| K | 1.430214E-02 | -6.156789E+01 | -1.020615E+00 | 8.240654E-02 | -2.966591E-01 | -7.612676E+01 |
| $a_2$ | 0.000000E+00 | 0.000000E+00 | 0.000000E+00 | 0.000000E+00 | 0.000000E+00 | 0.000000E+00 |
| $a_4$ | -1.036094E-03 | 8.359531E-03 | 7.946687E-03 | 7.641234E-03 | 2.623214E-03 | -1.799560E-02 |
| $a_6$ | 2.714569E-04 | 1.220834E-03 | -7.778328E-04 | 1.937954E-03 | 4.522547E-03 | 4.987058E-04 |
| $a_8$ | -2.182870E-05 | -1.957015E-04 | -1.024586E-04 | -6.517422E-04 | -6.509099E-04 | -1.955895E-04 |
| $a_{10}$ | 1.724821E-06 | 2.502731E-05 | 6.245793E-07 | -6.356521E-06 | -2.224152E-05 | 2.245455E-05 |
| $a_{12}$ | 4.619361E-07 | 3.484404E-06 | 1.078431E-06 | -9.209562E-07 | -1.627661E-06 | 6.781355E-06 |
| $a_{14}$ | 4.117835E-08 | -1.444237E-07 | 1.440352E-07 | -3.902308E-07 | 8.919708E-07 | 6.002284E-07 |
| $a_{16}$ | -9.425840E-10 | -1.536042E-07 | -1.683967E-07 | 3.617245E-07 | 3.789357E-07 | -1.626034E-08 |
| Surface # | 741 | 742 | 751 | 752 | 761 | 762 |
| K | -3.470224E+02 | 6.903421E+00 | 1.455165E-02 | -3.149843E-01 | 8.744164E-02 | 4.786179E+01 |
| $a_2$ | 0.000000E+00 | 0.000000E+00 | 0.000000E+00 | 0.000000E+00 | 0.000000E+00 | 0.000000E+00 |
| $a_4$ | -6.506427E-02 | -3.073599E-02 | 3.130575E-02 | 5.729281E-02 | -4.092658E-02 | -1.023357E-01 |
| $a_6$ | 3.978488E-03 | 5.274942E-03 | -1.276364E-02 | -1.887445E-02 | 9.749585E-03 | 2.832651E-02 |
| $a_8$ | -2.033595E-03 | -2.482197E-04 | 1.032205E-03 | 2.027147E-03 | -5.540409E-04 | -3.561064E-03 |
| $a_{10}$ | 1.097771E-03 | 9.370109E-05 | -5.258527E-05 | -2.800342E-05 | 5.205329E-06 | 1.632262E-04 |
| $a_{12}$ | 5.447769E-05 | 1.917431E-05 | -4.851676E-06 | -2.802227E-06 | 1.596215E-07 | 6.372232E-07 |
| $a_{14}$ | -6.317631E-05 | 4.108774E-06 | 5.061301E-07 | -1.722827E-07 | 3.633894E-08 | 3.370662E-09 |
| $a_{16}$ | 2.988815E-06 | -1.796719E-06 | 3.341120E-07 | 4.109534E-08 | -1.631653E-09 | -1.029641E-08 |

FIG. 33

| \multicolumn{7}{|l|}{EFL (Effective focus length) = 18.543 mm, HFOV (Half angular field of view) = 10.460deg., TTL (System length) =18.000 mm, Image height= 3.426 mm, Fno = 2.421} |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 800 | Aperture stop | ∞ | -1.623 | | | | |
| 811 | 1st lens element | 5.222 | 2.467_T1 | 1.545_n1 | 55.987_v1 | 9.732_f1 | plastic |
| 812 | | 243.893 | 0.223_G12 | | | | |
| 821 | 2nd lens lement | 23.795 | 0.419_T2 | 1.642_n2 | 22.409_v2 | -15.811_f2 | plastic |
| 822 | | 7.107 | 3.473_G23 | | | | |
| 831 | 3rd lens element | 9.461 | 1.385_T3 | 1.545_n3 | 55.987_v3 | 47.418_f3 | plastic |
| 832 | | 14.134 | 2.065_G34 | | | | |
| 841 | 4th lens element | 20.808 | 1.179_T4 | 1.545_n4 | 55.987_v4 | -74.500_f4 | plastic |
| 842 | | 13.493 | 0.346_G45 | | | | |
| 851 | 5th lens element | -8.260 | 1.060_T5 | 1.642_n5 | 22.409_v5 | 27.859_f5 | plastic |
| 852 | | -5.951 | 0.118_G56 | | | | |
| 861 | 6th lens element | -9.826 | 1.385_T6 | 1.545_n6 | 55.987_v6 | -13.916_f6 | plastic |
| 862 | | 35.260 | 0.698_G6F | | | | |
| 871 | IR cut filter | ∞ | 0.367_TF | | | | |
| 872 | | ∞ | 2.814_GFP | | | | |
| 880 | Image plane | ∞ | 0.000 | | | | |

FIG. 36

| \multicolumn{7}{c}{Aspherical parameters} |
| Surface # | 811 | 812 | 821 | 822 | 831 | 832 |
|---|---|---|---|---|---|---|
| K | 1.617729E-02 | -6.631105E+02 | 1.027529E+01 | 7.219738E-01 | -1.353807E+00 | -1.012122E+00 |
| $a_2$ | 0.000000E+00 | 0.000000E+00 | 0.000000E+00 | 0.000000E+00 | 0.000000E+00 | 0.000000E+00 |
| $a_4$ | -1.316631E-04 | 6.560378E-04 | 1.643479E-03 | 1.756292E-03 | -5.805993E-05 | -2.429340E-03 |
| $a_6$ | 5.347771E-06 | 2.181111E-05 | -1.679014E-05 | 7.279824E-05 | 1.195718E-04 | 1.544220E-04 |
| $a_8$ | -6.224402E-07 | -4.371044E-06 | -2.576304E-06 | -8.218985E-06 | -1.053158E-05 | -1.361365E-05 |
| $a_{10}$ | -1.208542E-08 | 1.768395E-07 | -2.781097E-08 | 6.020004E-07 | 1.757592E-07 | -5.565720E-07 |
| $a_{12}$ | 1.051326E-09 | 5.342167E-09 | 6.443986E-09 | 6.572600E-09 | 6.693200E-11 | 1.060467E-08 |
| $a_{14}$ | 7.133500E-11 | -1.394280E-10 | 6.863100E-10 | -3.040018E-09 | -8.372350E-10 | 3.229227E-09 |
| $a_{16}$ | -1.255000E-12 | -1.428300E-11 | -6.828900E-11 | 9.651000E-11 | -7.616700E-11 | -1.906460E-10 |
| Surface # | 841 | 842 | 851 | 852 | 861 | 862 |
| K | 4.183444E+01 | -9.174431E+01 | -1.219400E+00 | 4.004797E-04 | -2.239330E-01 | 1.054490E+02 |
| $a_2$ | 0.000000E+00 | 0.000000E+00 | 0.000000E+00 | 0.000000E+00 | 0.000000E+00 | 0.000000E+00 |
| $a_4$ | -1.361187E-02 | -9.000651E-03 | 6.402021E-03 | 8.724299E-03 | -8.100641E-03 | -9.862981E-03 |
| $a_6$ | 4.857313E-04 | 4.974825E-04 | -8.259047E-04 | -1.182206E-03 | 6.467165E-04 | 1.172598E-03 |
| $a_8$ | -4.623203E-05 | -1.310308E-05 | 1.350400E-05 | 4.879868E-05 | -3.837023E-06 | -7.678007E-05 |
| $a_{10}$ | 2.909907E-06 | -6.152822E-07 | -2.371351E-07 | 3.351484E-07 | 3.023580E-07 | 1.650006E-06 |
| $a_{12}$ | -1.096608E-07 | 8.450472E-08 | 2.845474E-09 | 1.385498E-08 | -1.457880E-08 | 6.184551E-08 |
| $a_{14}$ | -1.185326E-08 | 8.552710E-10 | 1.089800E-10 | -1.768470E-10 | -1.958349E-09 | 1.862758E-09 |
| $a_{16}$ | 5.365340E-10 | -4.823080E-10 | 2.158970E-10 | -3.667430E-10 | -8.036800E-11 | -4.794290E-10 |

FIG. 37

| EFL (Effective focus length) = 10.905 mm, HFOV (Half angular field of view) = 15.095deg., TTL (System length) = 10.898 mm, Image height= 2.944 mm, Fno = 2.492 |||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 900 | Aperture stop | ∞ | -0.758 | | | | |
| 911 | 1st lens element | 3.502 | 1.704_T1 | 1.545_n1 | 55.987_v1 | 8.077_f1 | plastic |
| 912 | | 14.049 | 0.098_G12 | | | | |
| 921 | 2nd lens lement | 32.127 | 0.239_T2 | 1.642_n2 | 22.409_v2 | -10.172_f2 | plastic |
| 922 | | 5.448 | 0.091_G23 | | | | |
| 931 | 3rd lens element | 3.790 | 1.423_T3 | 1.545_n3 | 55.987_v3 | 9.791_f3 | plastic |
| 932 | | 11.284 | 1.044_G34 | | | | |
| 941 | 4th lens element | -7.723 | 0.343_T4 | 1.545_n4 | 55.987_v4 | -22.336_f4 | plastic |
| 942 | | -21.375 | 1.541_G45 | | | | |
| 951 | 5th lens element | 26.362 | 1.873_T5 | 1.545_n5 | 55.987_v5 | -8.651_f5 | plastic |
| 952 | | 3.907 | 0.447_G56 | | | | |
| 961 | 6th lens element | -19.992 | 0.722_T6 | 1.642_n6 | 22.409_v6 | 14.778_f6 | plastic |
| 962 | | -6.562 | 0.400_G6F | | | | |
| 971 | IR cut filter | ∞ | 0.210_TF | | | | |
| 972 | | ∞ | 0.763_GFP | | | | |
| 980 | Image plane | ∞ | 0.000 | | | | |

FIG. 40

| Aspherical parameters | | | | | | |
|---|---|---|---|---|---|---|
| Surface # | 911 | 912 | 921 | 922 | 931 | 932 |
| K | 1.600254E-02 | -9.315203E+01 | 2.271504E+01 | 5.404320E-01 | -6.026596E-01 | 1.503371E+01 |
| $a_2$ | 0.000000E+00 | 0.000000E+00 | 0.000000E+00 | 0.000000E+00 | 0.000000E+00 | 0.000000E+00 |
| $a_4$ | -6.786074E-04 | 1.844949E-03 | 1.160007E-02 | 5.467159E-03 | -1.294710E-02 | -1.417814E-02 |
| $a_6$ | -8.563337E-06 | 1.937969E-03 | 2.837511E-04 | 7.240802E-03 | 1.063216E-02 | 1.407099E-03 |
| $a_8$ | 1.326892E-05 | -1.649669E-04 | -1.313415E-04 | -1.466538E-03 | -1.817220E-03 | -4.992144E-04 |
| $a_{10}$ | 8.762310E-07 | 3.511013E-05 | -4.625484E-06 | 1.364617E-05 | 8.547398E-06 | -3.854160E-05 |
| $a_{12}$ | 1.675028E-07 | 2.310423E-06 | -5.534906E-08 | -7.855928E-07 | 1.028180E-05 | 8.919183E-06 |
| $a_{14}$ | -1.910014E-08 | -8.676443E-07 | 8.154486E-08 | -6.258765E-07 | 1.860551E-06 | 1.899833E-06 |
| $a_{16}$ | 1.278317E-08 | -1.314624E-07 | -3.803563E-07 | 8.360396E-08 | -3.246641E-07 | -1.415104E-07 |
| Surface # | 941 | 942 | 951 | 952 | 961 | 962 |
| K | 2.219890E+00 | 4.819262E+01 | 3.093841E+01 | -1.617524E+00 | 1.506326E+01 | -4.041595E+01 |
| $a_2$ | 0.000000E+00 | 0.000000E+00 | 0.000000E+00 | 0.000000E+00 | 0.000000E+00 | 0.000000E+00 |
| $a_4$ | -4.778623E-02 | -3.936998E-02 | -3.405048E-02 | -3.539304E-02 | -2.780005E-02 | -4.120212E-02 |
| $a_6$ | 2.711196E-02 | 2.795510E-02 | 5.081432E-03 | 5.066194E-03 | 9.539555E-03 | 1.379923E-02 |
| $a_8$ | -5.184041E-03 | -4.511126E-03 | -3.069210E-04 | -2.284555E-04 | -1.044442E-03 | -1.992001E-03 |
| $a_{10}$ | 2.293843E-04 | 3.023029E-04 | 1.582560E-05 | -4.373160E-06 | 1.863759E-05 | 1.108056E-04 |
| $a_{12}$ | -2.373394E-05 | 3.429585E-05 | 4.062039E-07 | -2.086496E-06 | 1.229180E-07 | 4.720051E-07 |
| $a_{14}$ | -6.095950E-07 | -1.247549E-05 | -8.839120E-09 | -1.755740E-07 | 1.896870E-07 | -1.163694E-07 |
| $a_{16}$ | 2.196148E-06 | 1.266344E-06 | -1.883998E-08 | 4.619846E-08 | 1.106081E-09 | -6.026317E-09 |

FIG. 41

| EFL (Effective focus length) = 18.405mm, HFOV (Half angular field of view) = 10.613deg., TTL (System length) = 17.978 mm, Image height= 3.427 mm, Fno = 18.405 |||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 1000 | Aperture stop | ∞ | -1.520 | | | | |
| 1011 | 1st lens element | 5.316 | 3.051_T1 | 1.545_n1 | 55.987_v1 | 9.849_f1 | plastic |
| 1012 | | 355.478 | 0.123_G12 | | | | |
| 1021 | 2nd lens lement | 24.936 | 0.382_T2 | 1.642_n2 | 22.409_v2 | -15.746_f2 | plastic |
| 1022 | | 7.192 | 4.426_G23 | | | | |
| 1031 | 3rd lens element | 9.160 | 1.322_T3 | 1.545_n3 | 55.987_v3 | 68.610_f3 | plastic |
| 1032 | | 11.504 | 2.356_G34 | | | | |
| 1041 | 4th lens element | 19.695 | 0.945_T4 | 1.545_n4 | 55.987_v4 | -77.590_f4 | plastic |
| 1042 | | 13.219 | 0.336_G45 | | | | |
| 1051 | 5th lens element | -11.038 | 0.567_T5 | 1.642_n5 | 22.409_v5 | 28.824_f5 | plastic |
| 1052 | | -7.075 | 0.133_G56 | | | | |
| 1061 | 6th lens element | -10.501 | 1.271_T6 | 1.545_n6 | 55.987_v6 | -14.815_f6 | plastic |
| 1062 | | 36.805 | 0.698_G6F | | | | |
| 1071 | IR cut filter | ∞ | 0.367_TF | | | | |
| 1072 | | ∞ | 2.002_GFP | | | | |
| 1080 | Image plane | ∞ | 0.000 | | | | |

FIG. 44

| Aspherical parameters | | | | | | |
|---|---|---|---|---|---|---|
| Surface # | 1011 | 1012 | 1021 | 1022 | 1031 | 1032 |
| K | -3.948357E-03 | -9.649592E+02 | 1.075585E+01 | 7.575855E-01 | -1.587355E+00 | -1.831067E-01 |
| $a_2$ | 0.000000E+00 | 0.000000E+00 | 0.000000E+00 | 0.000000E+00 | 0.000000E+00 | 0.000000E+00 |
| $a_4$ | -9.873107E-05 | 6.246877E-04 | 1.633610E-03 | 1.848390E-03 | -1.496322E-04 | -2.023581E-03 |
| $a_6$ | 4.995502E-06 | 1.985925E-05 | -1.680987E-05 | 6.761719E-05 | 1.013144E-04 | 1.679496E-04 |
| $a_8$ | -5.662120E-07 | -4.247978E-06 | -2.649898E-06 | -7.674574E-06 | -9.325097E-06 | -1.446255E-05 |
| $a_{10}$ | -7.074608E-09 | 1.729533E-07 | -2.194849E-08 | 6.463197E-07 | 1.634311E-07 | -6.582906E-07 |
| $a_{12}$ | 1.069093E-09 | 4.666750E-09 | 8.099228E-09 | 1.354925E-08 | -1.803758E-08 | -9.411022E-09 |
| $a_{14}$ | 4.983000E-11 | -1.662340E-10 | 8.071470E-10 | -3.104916E-09 | -1.775223E-09 | 2.133789E-09 |
| $a_{16}$ | -3.078000E-12 | -1.254500E-11 | -6.936800E-11 | 1.439490E-10 | 1.635470E-10 | 1.695950E-10 |
| Surface # | 1041 | 1042 | 1051 | 1052 | 1061 | 1062 |
| K | 3.149318E+01 | -7.029009E+01 | -3.247659E+00 | 4.394503E-01 | -6.588881E+00 | 1.056169E+02 |
| $a_2$ | 0.000000E+00 | 0.000000E+00 | 0.000000E+00 | 0.000000E+00 | 0.000000E+00 | 0.000000E+00 |
| $a_4$ | -1.343356E-02 | -9.869247E-03 | 6.578346E-03 | 9.121415E-03 | -7.334433E-03 | -8.891751E-03 |
| $a_6$ | 4.572792E-04 | 4.479107E-04 | -8.570248E-04 | -1.212338E-03 | 6.828883E-04 | 1.115095E-03 |
| $a_8$ | -4.575815E-05 | -1.215668E-05 | 1.257966E-05 | 5.269207E-05 | -3.357631E-06 | -7.634844E-05 |
| $a_{10}$ | 2.784495E-06 | -2.118542E-07 | -2.418427E-07 | 2.671674E-07 | 2.274446E-07 | 1.737828E-06 |
| $a_{12}$ | -1.035427E-07 | 9.485121E-08 | 1.222077E-08 | -8.894450E-10 | -1.073222E-08 | 3.418355E-08 |
| $a_{14}$ | -1.211475E-08 | 5.587590E-10 | 3.579107E-09 | -4.342800E-11 | -1.181041E-09 | 7.864600E-10 |
| $a_{16}$ | 8.973280E-10 | -1.087230E-09 | -1.327000E-12 | 1.099140E-10 | -1.315390E-10 | -2.377310E-10 |

FIG. 45

| EFL (Effective focus length) = 11.229 mm, HFOV (Half angular field of view) = 14.610deg., TTL (System length) = 11.229 mm, Image height= 2.944 mm, Fno = =2.495 ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 1100 | Aperture stop | ∞ | -0.880 | | | | |
| 1111' | 1st lens element | 3.174 | 1.539_T1 | 1.545_n1 | 55.987_v1 | 6.273_f1 | plastic |
| 1112' | | 10.350 | 0.121_G12 | | | | |
| 1121' | 2nd lens lement | 10.243 | 0.494_T2 | 1.642_n2 | 22.409_v2 | -8.689_f2 | plastic |
| 1122' | | 3.646 | 1.128_G23 | | | | |
| 1131 | 3rd lens element | 5.368 | 0.856_T3 | 1.545_n3 | 55.987_v3 | 12.300_f3 | plastic |
| 1132 | | 394.193 | 1.452_G34 | | | | |
| 1141 | 4th lens element | -51.562 | 0.262_T4 | 1.545_n4 | 55.987_v4 | -88.315_f4 | plastic |
| 1142 | | -156.052 | 2.038_G45 | | | | |
| 1151 | 5th lens element | -3.347 | 0.872_T5 | 1.642_n5 | 22.409_v5 | 62.842_f5 | plastic |
| 1152 | | -2.666 | 0.225_G56 | | | | |
| 1161 | 6th lens element | -2.982 | 0.856_T6 | 1.545_n6 | 55.987_v6 | -11.624_f6 | plastic |
| 1162 | | -15.746 | 0.400_G6F | | | | |
| 1171 | IR cut filter | ∞ | 0.210_TF | | | | |
| 1172 | | ∞ | 0.776_GFP | | | | |
| 1180 | Image plane | ∞ | 0.000 | | | | |

FIG. 48

| Aspherical parameters | | | | | | |
|---|---|---|---|---|---|---|
| Surface # | 1111' | 1112' | 1121' | 1122' | 1131 | 1132 |
| K | 1.232039E-02 | -1.623667E+01 | -1.415589E+00 | -9.808686E-02 | -3.329526E+00 | 2.154150E+04 |
| $a_2$ | 0.000000E+00 | 0.000000E+00 | 0.000000E+00 | 0.000000E+00 | 0.000000E+00 | 0.000000E+00 |
| $a_4$ | -1.237727E-03 | 7.747244E-03 | 7.737219E-03 | 7.521064E-03 | -1.137721E-03 | -1.213163E-02 |
| $a_6$ | 4.348281E-04 | 6.865160E-04 | -5.357991E-04 | 3.092309E-04 | 3.464092E-03 | 2.602677E-03 |
| $a_8$ | -5.274912E-05 | -1.796430E-04 | -1.695956E-04 | -5.017828E-04 | -7.129207E-04 | -2.244470E-04 |
| $a_{10}$ | 2.459117E-06 | 2.167152E-05 | -8.943769E-06 | 9.410048E-06 | 6.072627E-06 | -5.374515E-05 |
| $a_{12}$ | 7.397737E-07 | 2.104508E-06 | -1.808517E-07 | -2.734087E-06 | 3.886523E-06 | -5.744805E-07 |
| $a_{14}$ | 2.315564E-08 | -3.408200E-07 | 3.694801E-07 | -8.342210E-07 | 6.585418E-07 | 2.561359E-06 |
| $a_{16}$ | -8.087079E-09 | -1.865091E-07 | 4.074464E-08 | 1.179616E-06 | 2.590631E-07 | 2.669239E-07 |
| Surface # | 1141 | 1142 | 1151 | 1152 | 1161 | 1162 |
| K | -4.079561E+05 | 4.683007E+03 | -5.898450E+00 | -3.492078E-01 | 3.415853E-01 | -5.333493E+02 |
| $a_2$ | 0.000000E+00 | 0.000000E+00 | 0.000000E+00 | 0.000000E+00 | 0.000000E+00 | 0.000000E+00 |
| $a_4$ | -7.261237E-02 | -5.387821E-02 | 3.017306E-02 | 5.894942E-02 | -2.775137E-02 | -7.217861E-02 |
| $a_6$ | 9.989820E-03 | 6.527055E-03 | -1.225245E-02 | -1.910224E-02 | 1.104557E-02 | 2.437390E-02 |
| $a_8$ | -2.436252E-03 | -6.415819E-04 | 1.221469E-03 | 2.377260E-03 | -6.897297E-04 | -3.321826E-03 |
| $a_{10}$ | 4.086454E-04 | 4.893026E-05 | -6.046176E-05 | -1.290529E-05 | -9.586393E-06 | 1.696876E-04 |
| $a_{12}$ | 7.008294E-05 | 2.479872E-05 | 2.441770E-06 | -6.878081E-06 | 1.275462E-07 | 3.294837E-07 |
| $a_{14}$ | 1.734474E-06 | 8.670855E-06 | 1.065044E-06 | -8.395816E-07 | 1.786882E-07 | -5.895580E-08 |
| $a_{16}$ | -3.319405E-06 | -2.165227E-06 | -1.486096E-07 | 7.369585E-09 | 8.321079E-09 | -1.436849E-08 |

FIG. 49

| Embodiment | 1st | 2nd | 3rd | 4th | 5th | 6th | 7th | 8th | 9th | 10th | 11th |
|---|---|---|---|---|---|---|---|---|---|---|---|
| BFL | 0.865 | 1.038 | 1.157 | 1.041 | 1.313 | 0.900 | 0.917 | 3.879 | 1.373 | 3.066 | 1.386 |
| Gaa | 1.621 | 3.988 | 3.922 | 3.908 | 4.145 | 4.511 | 3.368 | 6.226 | 3.221 | 7.373 | 4.964 |
| ALT | 2.871 | 5.386 | 4.881 | 4.758 | 5.485 | 4.435 | 5.786 | 7.896 | 6.304 | 7.538 | 4.879 |
| EFL/TTL | 1.032 | 1.053 | 1.094 | 1.129 | 1.000 | 1.116 | 1.092 | 1.030 | 1.001 | 1.024 | 1.000 |
| T4/T6 | 0.381 | 0.755 | 0.301 | 0.444 | 1.019 | 0.614 | 1.800 | 0.851 | 0.475 | 0.743 | 0.306 |
| BFL/T3 | 1.560 | 0.789 | 0.860 | 0.800 | 0.886 | 1.157 | 0.799 | 2.800 | 0.965 | 2.319 | 1.620 |
| BFL/T6 | 1.278 | 1.510 | 1.179 | 1.545 | 1.839 | 1.158 | 1.238 | 2.800 | 1.901 | 2.412 | 1.620 |
| TTL/T3 | 9.657 | 7.918 | 7.398 | 7.461 | 7.387 | 12.655 | 8.755 | 12.994 | 7.658 | 13.595 | 13.120 |
| T4/G34 | 0.657 | 0.324 | 0.267 | 0.201 | 0.437 | 0.391 | 1.396 | 0.571 | 0.328 | 0.401 | 0.181 |
| T5/G34 | 0.823 | 0.488 | 0.410 | 0.552 | 0.201 | 0.627 | 0.780 | 0.513 | 1.794 | 0.241 | 0.600 |
| ALT/T6 | 4.240 | 7.835 | 4.973 | 7.061 | 7.684 | 5.703 | 7.783 | 5.700 | 8.727 | 5.930 | 5.700 |
| TTL/T6 | 7.911 | 15.145 | 10.148 | 14.406 | 15.331 | 12.661 | 13.564 | 12.995 | 15.086 | 14.142 | 13.120 |
| Gaa/T3 | 2.922 | 3.033 | 2.913 | 3.004 | 2.798 | 5.798 | 2.933 | 4.494 | 2.263 | 5.576 | 5.800 |
| T1/T3 | 1.509 | 1.129 | 1.133 | 1.086 | 1.156 | 1.783 | 1.358 | 1.781 | 1.197 | 2.307 | 1.798 |
| Gaa/T6 | 2.394 | 5.801 | 3.996 | 5.800 | 5.807 | 5.800 | 4.544 | 4.494 | 4.459 | 5.800 | 5.800 |
| T1/T6 | 1.236 | 2.160 | 1.554 | 2.098 | 2.398 | 1.784 | 2.103 | 1.781 | 2.359 | 2.400 | 1.798 |
| BFL/G34 | 2.200 | 0.649 | 1.045 | 0.700 | 0.789 | 0.738 | 0.960 | 1.878 | 1.315 | 1.302 | 0.955 |
| ALT/G34 | 7.300 | 3.368 | 4.409 | 3.200 | 3.295 | 3.637 | 6.036 | 3.823 | 6.037 | 3.200 | 3.361 |
| TTL/G34 | 13.621 | 6.510 | 8.996 | 6.528 | 6.573 | 8.076 | 10.520 | 8.715 | 10.436 | 7.632 | 7.735 |
| Gaa/G34 | 4.122 | 2.493 | 3.542 | 2.628 | 2.490 | 3.700 | 3.524 | 3.014 | 3.084 | 3.130 | 3.420 |
| ALT/T3 | 5.175 | 4.096 | 3.625 | 3.657 | 3.703 | 5.700 | 5.023 | 5.700 | 4.430 | 5.700 | 5.700 |
| ALT/T1 | 3.430 | 3.627 | 3.200 | 3.366 | 3.204 | 3.196 | 3.700 | 3.200 | 3.700 | 2.471 | 3.170 |
| TTL/T1 | 6.400 | 7.010 | 6.530 | 6.867 | 6.393 | 7.097 | 6.449 | 7.296 | 6.396 | 5.892 | 7.297 |

FIG. 50

OPTICAL IMAGING LENS

RELATED APPLICATIONS

This application claims priority from China Patent Application No. 201610252412.3, filed on Apr. 21, 2016 and China Patent Application No. 201610352292.4, filed on May 25, 2016, the contents of which are hereby incorporated by reference in their entirety for all purposes.

TECHNICAL FIELD

The present disclosure relates to an optical imaging lens, and particularly, to an optical imaging lens having six lens elements.

BACKGROUND

Technology improves every day, continuously expanding consumer demand for increasingly compact electronic devices. This applies in the context of telephoto lens characteristics, in that key components for optical imaging lenses incorporated into consumer electronic products should keep pace with technological improvements in order to meet the expectations of consumers expectations. Some important characteristics of an optical imaging lens include image quality and size. Improvements in image sensor technology play an important role in raising consumer expectations related to image quality. However, reducing the size of the imaging lens while achieving good optical characteristics presents challenging problems. For example, in a typical optical imaging lens system having six lens elements, the distance from the object side surface of the first lens element to the image plane along the optical axis is too large to accommodate the slim profile of today's cell phones or digital cameras.

Decreasing the dimensions of an optical lens while maintaining good optical performance may not only be achieved by scaling down the lens. Rather, these benefits may be realized by improving other aspects of the design process, such as by varying the material used for the lens, or adjusting the assembly yield.

In this manner, there is a continuing need for improving the design characteristics of small sized optical lenses. Achieving these advancements may require overcoming unique challenges, even when compared to design improvements for traditional optical lenses. However, refining aspects of the optical lens manufacturing process that result in a lens that meets consumer demand and provides upgrades to imaging quality are always desirable objectives for industries, governments, and academia.

SUMMARY

The present disclosure provides for an optical imaging lens. By controlling the convex or concave shape of the surfaces of each lens element and the parameters in at least two equations, the length of the optical imaging lens may be shortened while maintaining good optical characteristics and system functionality.

In some embodiments, an optical imaging lens may comprise sequentially from an object side to an image side along an optical axis, an aperture stop, a first, second, third, fourth, fifth and sixth lens elements, and a filtering unit. Each of the first, second, third, fourth, fifth and sixth lens elements have varying refracting power in some embodiments. Additionally, some embodiments further comprise an object-side surface facing toward the object side, an image-side surface facing toward the image side, and a central thickness defined along the optical axis.

In the specification, parameters used herein may include:

| Parameter | Definition |
|---|---|
| T1 | The central thickness of the first lens element along the optical axis |
| G12 | The distance between the image-side surface of the first lens element and the object-side surface of the second lens element along the optical axis/The air gap between the first lens element and the second lens element along the optical axis |
| T2 | The central thickness of the second lens element along the optical axis |
| G23 | The air gap between the second lens element and the third lens element along the optical axis |
| T3 | The central thickness of the third lens element along the optical axis |
| G34 | The air gap between the third lens element and the fourth lens element along the optical axis |
| T4 | The central thickness of the fourth lens element along the optical axis |
| G45 | The air gap between the fourth lens element and the fifth lens element along the optical axis |
| T5 | The central thickness of the fifth lens element along the optical axis |
| G56 | The air gap between the fifth lens element and the sixth lens element along the optical axis |
| T6 | The central thickness of the sixth lens element along the optical axis |
| G6F | The distance between the image-side surface of the sixth lens element and the object-side surface of the filtering unit along the optical axis |
| TF | The central thickness of the filtering unit along the optical axis |
| GFP | The distance between the image-side surface of the filtering unit and an image plane along the optical axis |
| f1 | The focusing length of the first lens element |
| f2 | The focusing length of the second lens element |
| f3 | The focusing length of the third lens element |
| f4 | The focusing length of the fourth lens element |
| f5 | The focusing length of the fifth lens element |
| f6 | The focusing length of the sixth lens element |
| n1 | The refracting index of the first lens element |
| n2 | The refracting index of the second lens element |
| n3 | The refracting index of the third lens element |
| n4 | The refracting index of the fourth lens element |
| n5 | The refracting index of the fifth lens element |
| n6 | The refracting index of the sixth lens element |
| v1 | The Abbe number of the first lens element |
| v2 | The Abbe number of the second lens element |
| v3 | The Abbe number of the third lens element |
| v4 | The Abbe number of the fourth lens element |
| v5 | The Abbe number of the fifth lens element |
| v6 | The Abbe number of the sixth lens element |
| HFOV | Half Field of View of the optical imaging lens |
| Fno | F-number of the optical imaging lens |
| EFL | The effective focal length of the optical imaging lens |
| TTL | The distance between the object-side surface of the first lens element and an image plane along the optical axis/The length of the optical image lens |
| ALT | The sum of the central thicknesses of all lens elements |
| Gaa | The sum of all air gaps between all lens elements along the optical axis |
| BFL | The back focal length of the optical imaging lens/The distance from the image-side surface of the last lens element to the image plane along the optical axis |
| TL | The distance from the object-side surface of the first lens element to the image-side surface of the lens element adjacent to the image plane along the optical axis |
| Gmax | The maximum value of the air gaps between two adjacent lens elements of the first lens element to the sixth lens element |

According to some embodiments of the optical imaging lens of the present disclosure, the image-side surface of the first lens element may comprise a concave portion in a vicinity of a periphery of the first lens element; the image-side surface of the second lens element may comprise a concave portion in a vicinity of a periphery of the second lens element; the material of the third lens element may be plastic; the material of the fourth lens element may be plastic; the material of the fifth lens element may be plastic; the material of the sixth lens element may be plastic; and the optical imaging lens may comprise no other lenses having refracting power beyond the six lens elements.

In another exemplary embodiment, other equation(s), such as those relating to the ratio among parameters could be taken into consideration. For example, EFL and TTL could be controlled to satisfy the equation as follows:

$$1 \leq EFL/TTL \qquad \text{Equation (1); and}$$

TTL could be controlled to satisfy the equation as follows:

$$TTL \leq 18 \text{ mm} \qquad \text{Equation (2).}$$

Alternatively, other parameters could be taken into consideration. For example: T4 and T6 could be controlled to satisfy the equation as follows:

$$T4/T6 \leq 1.8 \qquad \text{Equation (3);}$$

BFL and T3 could be controlled to satisfy the equation as follows:

$$BFL/T3 \leq 2.8 \qquad \text{Equation (4);}$$

BFL and T6 could be controlled to satisfy the equation as follows:

$$BFL/T6 \leq 2.8 \qquad \text{Equation (5);}$$

TTL and T3 could be controlled to satisfy the equation as follows:

$$TTL/T3 \leq 17.9 \qquad \text{Equation (6);}$$

G34 and T4 could be controlled to satisfy the equation as follows:

$$T4/G34 \leq 1.4 \qquad \text{Equation (7);}$$

T5 and G34 could be controlled to satisfy the equation as follows:

$$T5/G34 \leq 1.8 \qquad \text{Equation (8);}$$

ALT and T6 could be controlled to satisfy the equation as follows:

$$ALT/T6 \leq 9.3 \qquad \text{Equation (9);}$$

TTL and T6 could be controlled to satisfy the equation as follows:

$$TTL/T6 \leq 17.9 \qquad \text{Equation (10);}$$

Gaa and T3 could be controlled to satisfy the equation as follows:

$$Gaa/T3 \leq 5.8 \qquad \text{Equation (11);}$$

T1 and T3 could be controlled to satisfy the equation as follows:

$$T1/T3 \leq 2.4 \qquad \text{Equation (12);}$$

Gaa and T6 could be controlled to satisfy the equation as follows:

$$Gaa/T6 \leq 5.8 \qquad \text{Equation (13);}$$

T1 and T6 could be controlled to satisfy the equation as follows:

$$T1/T6 \leq 2.4 \qquad \text{Equation (14);}$$

BFL and G34 could be controlled to satisfy the equation as follows:

$$BFL/G34 \leq 2.2 \qquad \text{Equation (15);}$$

ALT and G34 could be controlled to satisfy the equation as follows:

$$ALT/G34 \leq 7.3 \qquad \text{Equation (16);}$$

TTL and G34 could be controlled to satisfy the equation as follows:

$$TTL/G34 \leq 13.9 \qquad \text{Equation (17);}$$

Gaa and G34 could be controlled to satisfy the equation as follows:

$$Gaa/G34 \leq 4.5 \qquad \text{Equation (18);}$$

ALT and T3 could be controlled to satisfy the equation as follows:

$$ALT/T3 \leq 5.7 \qquad \text{Equation (19);}$$

ALT and T1 could be controlled to satisfy the equation as follows:

$$ALT/T1 \leq 3.7 \qquad \text{Equation (20); or}$$

TTL and T1 could be controlled to satisfy the equation as follows:

$$TTL/T1 \leq 7.3 \qquad \text{Equation (21).}$$

The aforesaid parameters and equations are not limited to particular embodiments, and could be selectively incorporated in other embodiments described herein. In some embodiments, more details about the convex or concave surface structure could be incorporated for one specific lens element or broadly for plural lens elements to enhance the control for the system performance and/or resolution. It is further noted that the details listed herein could be incorporated into other example embodiments if no inconsistency occurs.

By controlling the convex or concave shape of the surfaces, exemplary embodiments of the optical imaging lens systems herein achieve good optical characteristics, provide an enlarged aperture, reduce the field of view, increase assembly yield, and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 1 depicts a cross-sectional view of one single lens element according to the present disclosure;

FIG. 2 depicts a schematic view of the relation between the surface shape and the optical focus of the lens element;

FIG. 3 depicts a schematic view of a first example of the surface shape and the efficient radius of the lens element;

FIG. 4 depicts a schematic view of a second example of the surface shape and the efficient radius of the lens element;

FIG. 5 depicts a schematic view of a third example of the surface shape and the efficient radius of the lens element;

FIG. 8 depicts a table of optical data for each lens element of the optical imaging lens of a first embodiment of the present disclosure;

FIG. 9 depicts a table of aspherical data of a first embodiment of the optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of a sixth embodiment of an optical imaging lens according to the present disclosure;

FIG. 29 depicts a table of aspherical data of a sixth embodiment of the optical imaging lens according to the present disclosure;

FIG. 32 depicts a table of optical data for each lens element of the optical imaging lens of a seventh embodiment of the present disclosure;

FIG. 33 depicts a table of aspherical data of a seventh embodiment of the optical imaging lens according to the present disclosure;

FIG. 36 depicts a table of optical data for each lens element of the optical imaging lens of an eighth embodiment of the present disclosure;

FIG. 37 depicts a table of aspherical data of an eighth embodiment of the optical imaging lens according to the present disclosure;

FIG. 40 depicts a table of optical data for each lens element of the optical imaging lens of a ninth embodiment of the present disclosure;

FIG. 41 depicts a table of aspherical data of a ninth embodiment of the optical imaging lens according to the present disclosure;

FIG. 44 depicts a table of optical data for each lens element of the optical imaging lens of a tenth embodiment of the present disclosure;

FIG. 45 depicts a table of aspherical data of a tenth embodiment of the optical imaging lens according to the present disclosure;

FIG. 48 depicts a table of optical data for each lens element of the optical imaging lens of an eleventh embodiment of the present disclosure;

FIG. 49 depicts a table of aspherical data of an eleventh embodiment of the optical imaging lens according to the present disclosure;

FIG. 50 is a table for the values of BFL, Gaa, ALT, EFL/TTL, T4/T6, BFL/T3, BFL/T6, TTL/T3, T4/G34, T5/G34, ALT/T6, TTL/T6, Gaa/T3, T1/T3, Gaa/T6, T1/T6, BFL/G34, ALT/G34, TTL/G34, Gaa/G34, ALT/T3, ALT/T1 and TTL/T1 of the first to eleventh example embodiments.

DETAILED DESCRIPTION

Figure 6:
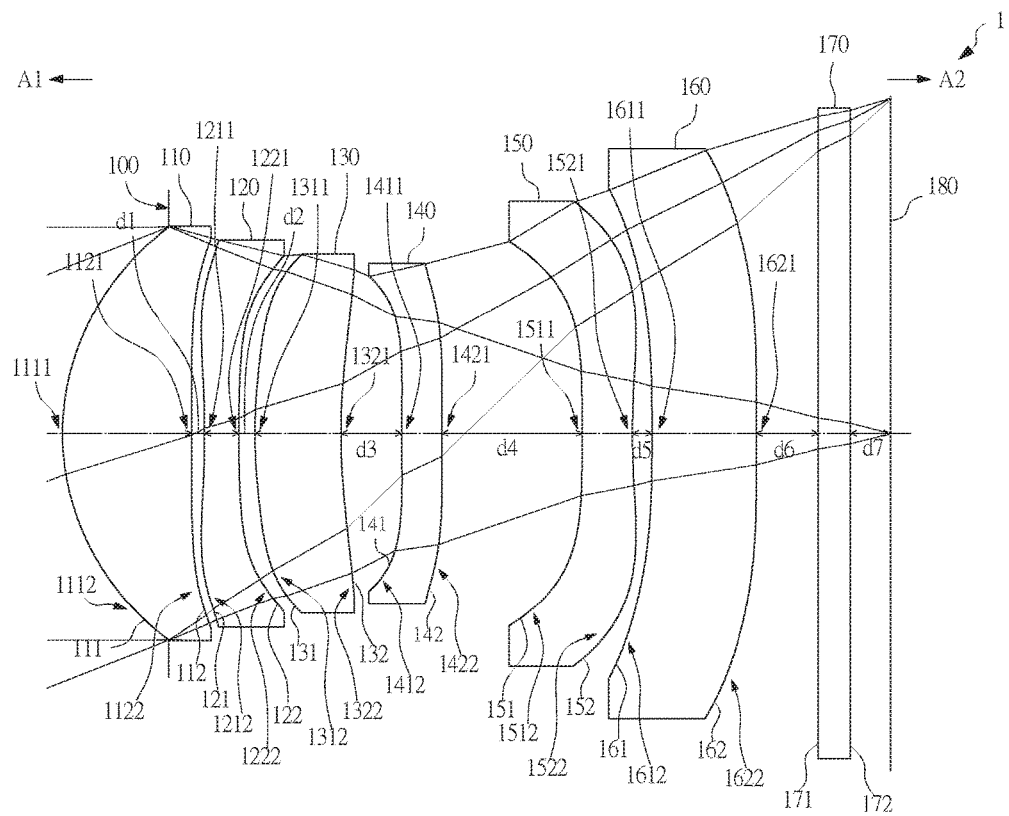
FIG. 6 depicts a cross-sectional view of a first embodiment of an optical imaging lens having six lens elements according to the present disclosure.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refractive power)" means that the paraxial refractive power of the lens element in Gaussian optics is positive (or negative). The description "An object-side (or image-side) surface of a lens element" may include a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element may be rotationally symmetric, where the optical axis I is the axis of symmetry. The region A of the lens element is defined as "a part in a vicinity of the optical axis", and the region C of the lens element is defined as "a part in a vicinity of a periphery of the lens element". Besides, the lens element may also have an extending part E extended radially and outwardly from the region C, namely the part outside of the clear aperture of the lens element. The extending part E may be used for physically assembling the lens element into an optical imaging lens system. Under normal circumstances, the imaging rays would not pass through the extending part E because those imaging rays only pass through the clear aperture. The structures and shapes of the aforementioned extending part E are only examples for technical explanation, the structures and shapes of lens elements should not be limited to these examples. Note that the extending parts of the lens element surfaces depicted in the following embodiments are partially omitted.

The following criteria are provided for determining the shapes and the parts of lens element surfaces set forth in the present specification. These criteria mainly determine the boundaries of parts under various circumstances including the part in a vicinity of the optical axis, the part in a vicinity of a periphery of a lens element surface, and other types of lens element surfaces such as those having multiple parts.

FIG. 1 depicts a radial cross-sectional view of a lens element. Before determining boundaries of those aforesaid parts, two referential points should be defined first, the central point and the transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The part of a surface of the lens element between the central point and the first transition point is defined as the part in a vicinity of the optical axis. The part located radially outside of the Nth transition point (but still within the scope of the clear aperture) is defined as the part in a vicinity of a periphery of the lens element. In some embodiments, there are other parts existing between the part in a vicinity of the optical axis and the part in a vicinity of a periphery of the lens element; the numbers of parts depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining the shape of a part is convex or concave depends on whether a collimated ray passing through that part converges or diverges. That is, while applying a collimated ray to a part to be determined in terms of shape, the collimated ray passing through that part will be bended and the ray itself or its extension line will eventually meet the optical axis. The shape of that part can be determined by whether the ray or its extension line meets (intersects) the optical axis (focal point) at the object-side or image-side. For instance, if the ray itself intersects the optical axis at the image side of the lens element after passing through a part, i.e. the focal point of this ray is at the image side (see point R in FIG. 2), the part will be determined as having a convex shape. On the contrary, if the ray diverges after passing through a part, the extension line of the ray intersects the optical axis at the object side of the lens element, i.e. the focal point of the ray is at the object side (see point M in FIG. 2), that part will be determined as having a concave shape. Therefore, referring to FIG. 2, the part between the central point and the first transition point may have a convex shape, the part located radially outside of the first transition point may have a concave shape, and the first transition point is the point where the part having a convex shape changes to the part having a concave shape, namely the border of two adjacent parts. Alternatively, there is another method to determine whether a part in a vicinity of the optical axis may have a convex or concave shape by referring to the sign of an "R" value, which is the (paraxial) radius of curvature of a lens surface. The R value may be used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the part in a vicinity of the optical axis may be defined as the part between 0-50% of the effective radius (radius of the clear aperture) of the surface, whereas the part in a vicinity of a periphery of the lens element may be defined as the part between 50-100% of effective radius (radius of the clear aperture) of the surface.

Referring to the first example depicted in FIG. 3, only one transition point, namely a first transition point, appears within the clear aperture of the image-side surface of the lens element. Part I may be a part in a vicinity of the optical axis, and part II may be a part in a vicinity of a periphery of the lens element. The part in a vicinity of the optical axis may be determined as having a concave surface due to the R value at the image-side surface of the lens element is positive. The shape of the part in a vicinity of a periphery of the lens element may be different from that of the radially inner adjacent part, i.e. the shape of the part in a vicinity of a periphery of the lens element may be different from the shape of the part in a vicinity of the optical axis; the part in a vicinity of a periphery of the lens element may have a convex shape.

Referring to the second example depicted in FIG. 4, a first transition point and a second transition point may exist on the object-side surface (within the clear aperture) of a lens element. In which part I may be the part in a vicinity of the optical axis, and part III may be the part in a vicinity of a periphery of the lens element. The part in a vicinity of the optical axis may have a convex shape because the R value at the object-side surface of the lens element may be positive. The part in a vicinity of a periphery of the lens element (part III) may have a convex shape. What is more, there may be another part having a concave shape existing between the first and second transition point (part II).

Referring to a third example depicted in FIG. 5, no transition point may exist on the object-side surface of the lens element. In this case, the part between 0-50% of the effective radius (radius of the clear aperture) may be determined as the part in a vicinity of the optical axis, and the part between 50-100% of the effective radius may be determined as the part in a vicinity of a periphery of the lens element. The part in a vicinity of the optical axis of the object-side surface of the lens element may be determined as having a convex shape due to its positive R value, and the part in a vicinity of a periphery of the lens element may be determined as having a convex shape as well.

In the present disclosure, various examples of optical imaging lenses are provided, including examples in which the optical imaging lens is a prime lens. Example embodiments of optical imaging lenses may comprise, sequentially from an object side to an image side along an optical axis, a first, second, third, fourth, fifth and sixth lens elements and a filter unit, in which each of said lens elements has an object-side surface facing toward the object side and an image-side surface facing toward the image side. The optical imaging lens of the present disclosure achieves good optical characteristics and provides a shortened length due to the design characteristics of each lens element.

The optical imaging lens may include variations of any of the above mentioned characteristics, and the system may vary one or more lens elements. In addition, the system may include variations of additional optical features as well as variations of the optical lens length of the optical imaging lens. For example, the first lens element may have positive refracting power, which is favorable to gather light; the object-side surface of the second lens element may comprise a convex portion in a vicinity of a periphery of the second lens element and the object-side surface of the third lens element may comprise a convex portion in a vicinity of a periphery of the third lens element, which is favorable to gather edge image light; the object-side surface of the sixth lens element may comprise a concave portion in a vicinity of a periphery of the sixth lens element and the image-side surface may comprise a convex portion in a vicinity of a periphery of the sixth lens element. The above mentioned designs may effectively eliminate aberrations, reduce the length of the optical lens, and enhance imaging quality and telephoto characteristics, to provide a more clear image of a local portion of the object.

In addition, controlling the parameters of each lens element as described herein may beneficially provide a designer with the flexibility to design an optical imaging lens with good optical performance, shortened length, enhanced telephoto characteristics, and technological feasibility.

For example, lengthening EFL may reduce the field of view for telephoto characteristics. However, the optical imaging lens used in many cell phones today involves miniaturized dimensions that may affect the lengthening range of the EFL. In view of the above, satisfying any one of the following equations may result in decreasing the thickness of the system. Furthermore, the field of view may be reduced and at least one of the following telephoto characteristics may be satisfied:

$$1 \leq EFL/TTL \qquad \text{Equation (1)}.$$

Furthermore, in some embodiments, the value of EFL/TTL may be further restricted between 1.00 and 1.50.

Properly decreasing the thicknesses of the lens elements as well as the air gaps between the lens elements serves to shorten the length of the optical imaging lens and allow for the system to focus more easily, which raises image quality. In this manner, the thicknesses of the lens elements and the air gaps between the lens elements may be adjusted to satisfy any one of equations described below, to result in arrangements that overcome the difficulties of providing improved imaging quality while overcoming the previously described difficulties related to assembling the optical lens system:

$$T4/T6 \leq 1.8 \qquad \text{Equation (3);}$$

$$BFL/T3 \leq 2.8 \qquad \text{Equation (4);}$$

$$BFL/T6 \leq 2.8 \qquad \text{Equation (5);}$$

$$T4/G34 \leq 1.4 \qquad \text{Equation (7);}$$

$$T5/G34 \leq 1.8 \qquad \text{Equation (8);}$$

$$ALT/T6 \leq 9.3 \qquad \text{Equation (9);}$$

$$Gaa/T3 \leq 5.8 \qquad \text{Equation (11);}$$

$$T1/T3 \leq 2.4 \qquad \text{Equation (12);}$$

$$Gaa/T6 \leq 5.8 \qquad \text{Equation (13);}$$

$$T1/T6 \leq 2.4 \qquad \text{Equation (14)};$$

$$BFL/G34 \leq 2.2 \qquad \text{Equation (15)};$$

$$ALT/G34 \leq 7.3 \qquad \text{Equation (16)};$$

$$Gaa/G34 \leq 4.5 \qquad \text{Equation (18)};$$

$$ALT/T3 \leq 5.7 \qquad \text{Equation (19); and}$$

$$ALT/T1 \leq 3.7 \qquad \text{Equation (20)}.$$

When the design of the optical imaging lens could satisfy any one of Equations (3), (4), (5), (7), (8), (9), (11), (12), (13), (14), (15), (16), (18), (19) and (20), and the denominators of theses equations are fixed, the numerators could be reduced to reduce the volume of the optical imaging lens.

In some embodiments, the value of T4/T6 may be further restricted between 0.3 and 1.8. In some embodiments, the value of BFL/T3 may be further restricted between 0.70 and 2.8. In some embodiments, the value of BFL/T6 may be further restricted between 1.00 and 2.8. In some embodiments, the value of T4/G34 may be further restricted between 0.10 and 1.4. In some embodiments, the value of T5/G34 may be further restricted between 0.20 and 1.8. In some embodiments, the value of ALT/T6 may be further restricted between 3.4 and 9.3. In some embodiments, the value of Gaa/T3 may be further restricted between 1.7 and 5.8. In some embodiments, the value of T1/T3 may be further restricted between 1.00 and 2.40. In some embodiments, the value of Gaa/T6 may be further restricted between 1.00 and 5.80. In some embodiments, the value of T1/T6 may be further restricted between 0.60 and 2.40. In some embodiments, the value of BFL/G34 may be further restricted between 0.60 and 2.20. In some embodiments, the value of ALT/G34 may be further restricted between 3.20 and 7.30. In some embodiments, the value of Gaa/G34 may be further restricted between 2.20 and 4.50. In some embodiments, the value of ALT/T3 may be further restricted between 3.50 and 5.70. In some embodiments, the value of ALT/T1 may be further restricted between 2.20 and 3.70.

In addition, the parameters set forth in the present disclosure could be varied to satisfy any one of equations below, such that the optical imaging lens could be in proper arrangement and have good image quality:

$$TTL/T3 \leq 17.9 \qquad \text{Equation (6)};$$

$$TTL/T6 \leq 17.9 \qquad \text{Equation (10)};$$

$$TTL/G34 \leq 13.9 \qquad \text{Equation (17); and}$$

$$TTL/T1 \leq 7.3 \qquad \text{Equation (21)}.$$

In some embodiments, the value of TTL/T3 may be further restricted between 6.6 and 17.9. In some embodiments, the value of TTL/T6 may be further restricted between 5.4 and 17.9. In some embodiments, the value of TTL/G34 may be further restricted between 6.5 and 13.9. In some embodiments, the value of TTL/T1 may be further restricted between 5.3 and 7.3.

Moreover, designing the optical imaging lens to additionally satisfy the equation HFOV≤25°, advantageously improves imaging in applications where uniform light of the image has an impact upon imaging quality. Furthermore, satisfying the HFOV criteria reduces difficulties related to designing and processing the optical image lens.

It should be appreciated that numerous variations are possible when considering improvements to the design of an optical system. When the optical imaging lens of the present disclosure satisfies at least one of the equations described above, the length of the optical lens may be reduced, the aperture stop may be enlarged (F-number may be reduced), the field angle may be reduced, the imaging quality may be enhanced, or the assembly yield may be upgraded. Such characteristics may advantageously mitigate various drawbacks in other optical system designs.

When implementing example embodiments, more details about the convex or concave surface could be incorporated for one specific lens element or broadly for plural lens elements to enhance the control for the system performance and/or resolution. It is noted that the details listed here could be incorporated in example embodiments if no inconsistency occurs.

Figure 7:
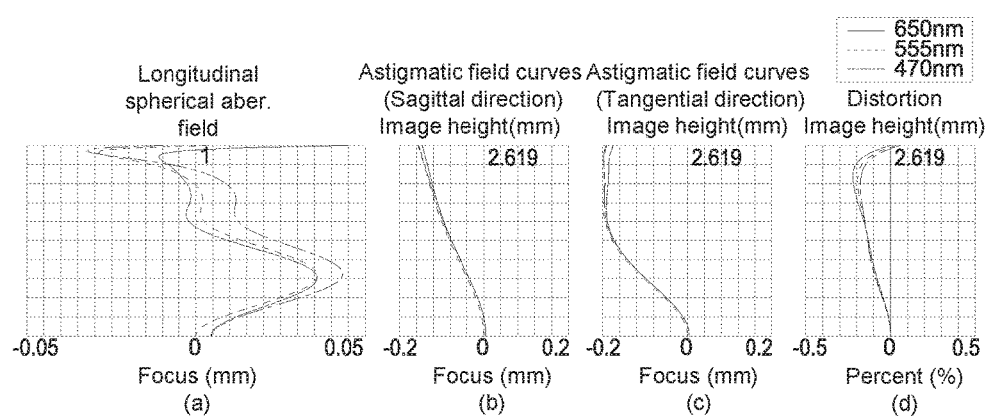
FIG. 7 depicts a chart of longitudinal spherical aberration and other kinds of optical aberrations of a first embodiment of the optical imaging lens according to the present disclosure.

Several exemplary embodiments and associated optical data will now be provided to illustrate non-limiting examples of optical imaging lens systems having good optical characteristics and a shortened length. Reference is now made to FIGS. 6-9. FIG. 6 illustrates an example cross-sectional view of an optical imaging lens 1 having six lens elements according to a first example embodiment. FIG. 7 shows example charts of longitudinal spherical aberration and other kinds of optical aberrations of the optical imaging lens 1 according to the first example embodiment. FIG. 8 illustrates an example table of optical data of each lens element of the optical imaging lens 1 according to the first example embodiment. FIG. 9 depicts an example table of aspherical data of the optical imaging lens 1 according to the first example embodiment.

As shown in FIG. 6, the optical imaging lens 1 of the present embodiment may comprise, in order from an object side A1 to an image side A2 along an optical axis, an aperture stop 100, a first lens element 110, a second lens element 120, a third lens element 130, a fourth lens element 140, a fifth lens element 150 and a sixth lens element 160. A filtering unit 170 and an image plane 180 of an image sensor (not shown) are positioned at the image side A2 of the optical imaging lens 1. Each of the first, second, third, fourth, fifth and sixth lens elements 110, 120, 130, 140, 150, 160 and the filtering unit 170 may comprise an object-side surface 111/121/131/141/151/161/171 facing toward the object side A1 and an image-side surface 112/122/132/142/152/162/172 facing toward the image side A2. The example embodiment of the filtering unit 170 illustrated is an IR cut filter (infrared cut filter) positioned between the sixth lens element 160 and an image plane 180. The filtering unit 170 selectively absorbs light passing optical imaging lens 1 that has a specific wavelength. For example, if IR light is absorbed, IR light which is not seen by human eyes is prohibited from producing an image on the image plane 180.

Exemplary embodiments of each lens element of the optical imaging lens 1 will now be described with reference to the drawings. The lens elements of the optical imaging lens 1 are constructed using plastic material, in some embodiments.

An example embodiment of the first lens element 110 may have positive refracting power. The object-side surface 111 may comprise a convex portion 1111 in a vicinity of an optical axis and a convex portion 1112 in a vicinity of a periphery of the first lens element 110. The image-side surface 112 may comprise a concave portion 1121 in a vicinity of the optical axis and a concave portion 1122 in a vicinity of a periphery of the first lens element 110. The object-side surface 111 and the image-side surface 112 may be aspherical surfaces.

An example embodiment of the second lens element 120 may have negative refracting power. The object-side surface 121 may comprise a concave portion 1211 in a vicinity of the optical axis and a convex portion 1212 in a vicinity of a periphery of the second lens element 120. The image-side surface 122 may comprise a concave portion 1221 in a vicinity of the optical axis and a concave portion 1222 in a vicinity of a periphery of the second lens element 120. The object-side surface 121 and the image-side surface 122 may be aspherical surfaces.

An example embodiment of the third lens element 130 may have positive refracting power. The object-side surface 131 may comprise a convex portion 1311 in a vicinity of the optical axis and a convex portion 1312 in a vicinity of a periphery of the third lens element 130. The image-side surface 132 may comprise a concave portion 1321 in a vicinity of the optical axis and a concave portion 1322 in a vicinity of a periphery of the third lens element 130. The object-side surface 131 and the image-side surface 132 may be aspherical surfaces.

An example embodiment of the fourth lens element 140 may have positive refracting power. The object-side surface 141 may comprise a convex portion 1411 in a vicinity of the optical axis and a concave portion 1412 in a vicinity of a periphery of the fourth lens element 140. The image-side surface 142 may comprise a concave portion 1421 in a vicinity of the optical axis and a convex portion 1422 in a vicinity of a periphery of the fourth lens element 140. The object-side surface 141 and the image-side surface 142 may be aspherical surfaces.

An example embodiment of the fifth lens element 150 may have negative refracting power. The object-side surface 151 may comprise a concave portion 1511 in a vicinity of the optical axis and a concave portion 1512 in a vicinity of a periphery of the fifth lens element 150. The image-side surface 152 may comprise a concave portion 1521 in a vicinity of the optical axis and a convex portion 1522 in a vicinity of a periphery of the fifth lens element 150. The object-side surface 151 and the image-side surface 152 may be aspherical surfaces.

An example embodiment of the sixth lens element 160 may have negative refracting power. The object-side surface 161 may comprise a concave portion 1611 in a vicinity of the optical axis and a concave portion 1612 in a vicinity of a periphery of the sixth lens element 160. The image-side surface 162 may comprise a concave portion 1621 in a vicinity of the optical axis and a convex portion 1622 in a vicinity of a periphery of the sixth lens element 160. The object-side surface 161 and the image-side surface 162 may be aspherical surfaces.

In example embodiments, air gaps exist between the lens elements 110, 120, 130, 140, 150, the filtering unit 170 and the image plane 180 of the image sensor. For example, FIG. 6 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the sixth lens element 160, the air gap d6 existing between the sixth lens element 160 and the filtering unit 170, and the air gap d7 existing between the filtering unit 170 and the image plane 180 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3 is denoted by G34, the air gap d4 is denoted by G45, the air gap d5 is denoted by G56, the air gap d6 is denoted by G6F, the air gap d7 is denoted by GFP, and the sum of d1, d2, d3, d4 and d5 is denoted by Gaa.

FIG. 8 depicts the optical characteristics of each lens elements in the optical imaging lens 1 of the present embodiment. The aspherical surfaces including the object-side surface 111 of the first lens element 110, the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, the object-side surface 161 and the image-side surface 162 of the sixth lens element 160 are all defined by the following aspherical formula (1):

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i} \qquad \text{formula (1)}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 9.

FIG. 7 part a shows the longitudinal spherical aberration, wherein the horizontal axis of FIG. 7 part a defines the focus, and the vertical axis of FIG. 7 part a defines the field of view. FIG. 7 part b shows the astigmatism aberration in the sagittal direction, wherein the horizontal axis of FIG. 7 part b defines the focus, and the vertical axis of FIG. 7 part b defines the image height. FIG. 7 part c shows the astigmatism aberration in the tangential direction, wherein the horizontal axis of FIG. 7 part c defines the focus, and the vertical axis of FIG. 7 part c defines the image height. FIG. 7 part d shows the variation of the distortion aberration, wherein the horizontal axis of FIG. 7 part d defines the percentage, and the vertical axis of FIG. 7 part d defines the image height. The three curves with different wavelengths (470 nm, 555 nm, 650 nm) represent that off-axis light with respect to these wavelengths may be focused around an image point. From the vertical deviation of each curve shown in FIG. 7 part a, the offset of the off-axis light relative to the image point may be within about ±0.05 mm. Therefore, the first embodiment may improve the longitudinal spherical aberration with respect to different wavelengths. Referring to FIG. 7 part b, the focus variation with respect to the three different wavelengths (470 nm, 555 nm, 650 nm) in the whole field may fall within about ±0.16 mm. Referring to FIG. 7 part c, the focus variation with respect to the three different wavelengths (470 nm, 555 nm, 650 nm) in the whole field may fall within about ±0.20 mm. Referring to FIG. 7 part d, the horizontal axis of FIG. 7 part d, the variation of the distortion aberration may be within about ±0.25%.

Please refer to FIG. 50 for the values of BFL, Gaa, ALT, EFL/TTL, T4/T6, BFL/T3, BFL/T6, TTL/T3, T4/G34, T5/G34, ALT/T6, TTL/T6, Gaa/T3, T1/T3, Gaa/T6, T1/T6, BFL/G34, ALT/G34, TTL/G34, Gaa/G34, ALT/T3, ALT/T1 and TTL/T1 of the present embodiment.

The distance from the object-side surface 111 of the first lens element 110 to the image plane 180 along the optical axis may be about 5.357 mm. In accordance with these values, the present embodiment may provide an optical imaging lens having a shortened length, and may be capable of accommodating a slim product profile that also renders improved optical performance.

Figure 10:
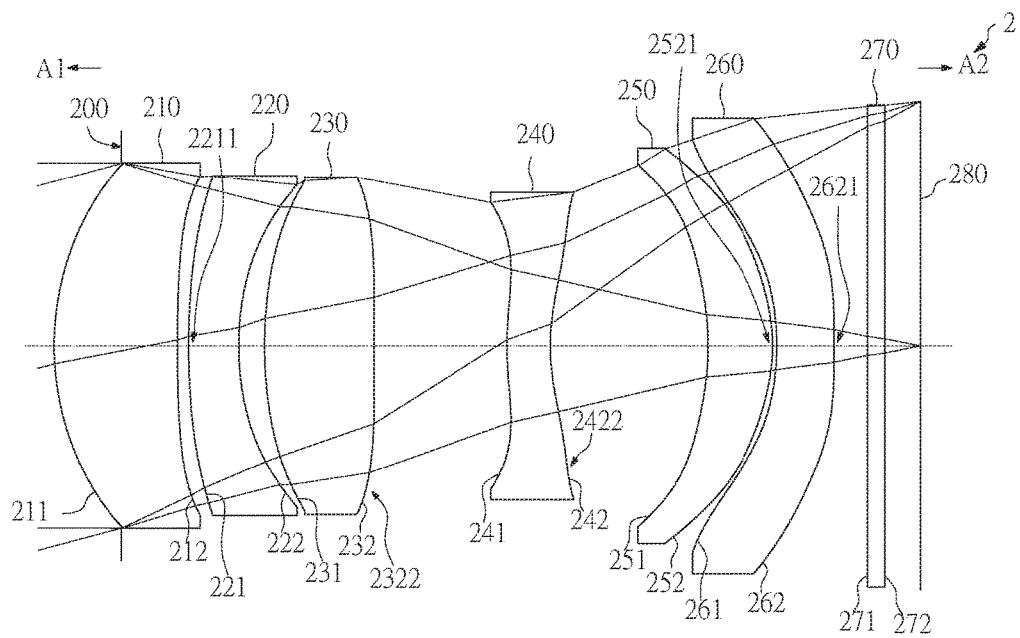
FIG. 10 depicts a cross-sectional view of a second embodiment of an optical imaging lens having six lens elements according to the present disclosure.
Figure 11:
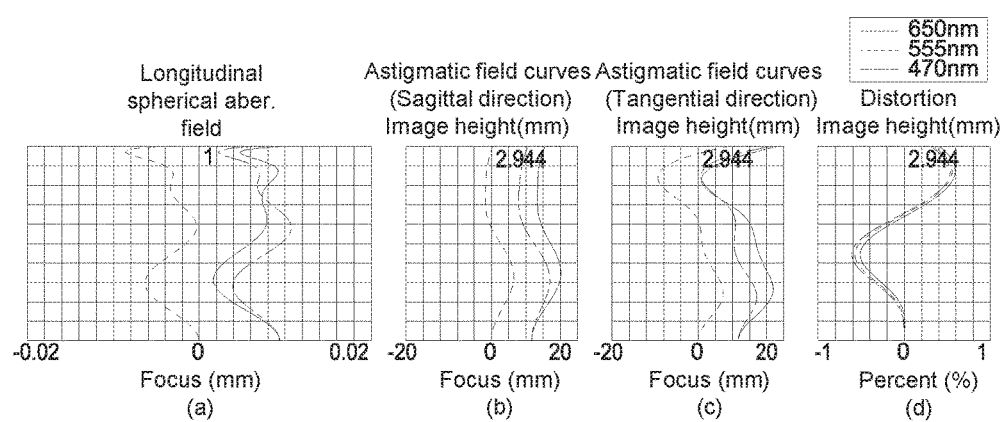
FIG. 11 depicts a chart of longitudinal spherical aberration and other kinds of optical aberrations of a second embodiment of the optical imaging lens according the present disclosure.

Reference is now made to FIGS. 10-13. FIG. 10 illustrates an example cross-sectional view of an optical imaging lens 2 having six lens elements according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise an aperture stop 200, a first lens element 210, a second lens element 220, a third lens element 230, a fourth lens element 240, a fifth lens element 250 and a sixth lens element 260.

The arrangement of the convex or concave surface structures, including the object-side surfaces 211, 231, 241, 251, and 261 and the image-side surfaces 212 and 222 are generally similar with the optical imaging lens 1. The differences between the optical imaging lens 1 and the optical imaging lens 2 may include the concave/convex shapes of at least one of the following: the object-side surface 221 and the image-side surfaces 232, 242, 252, 262. Additional differences may include the refracting power, a radius of curvature, a thickness, an aspherical data, and an effective focal length of each lens element. More specifically, the object-side surface 221 may comprise a convex portion 2211 in a vicinity of the optical axis, the image-side surface 232 may comprise a convex portion 2322 in a vicinity of a periphery of the third lens element 230, the image-side surface 242 may comprise a concave portion 2422 in a vicinity of a periphery of the fourth lens element 240, the image-side surface 252 may comprise a convex portion 2521 in a vicinity of the optical axis, the image-side surface 262 may comprise a convex portion 2621 in a vicinity of the optical axis, the fourth lens element 240 may have negative refracting power, and the fifth lens element 250 may have positive refracting power.

Here, for clearly showing the drawings of the present embodiment, only the surface shapes which are different from that in the first embodiment are labeled. Please refer to FIG. 12 for the optical characteristics of each lens element in the optical imaging lens 2 of the present embodiment.

From the vertical deviation of each curve shown in FIG. 11 part a, the offset of the off-axis light relative to the image point may be within about ±0.01 mm. Referring to FIG. 11 part b, the focus variation with respect to the three different wavelengths (470 nm, 555 nm, 650 nm) in the whole field may fall within about ±0.20 μm. Referring to FIG. 11 part c, the focus variation with respect to the three different wavelengths (470 nm, 555 nm, 650 nm) in the whole field may fall within about ±0.20 μm. Referring to FIG. 11 part d, the variation of the distortion aberration of the optical imaging lens 2 may be within about ±0.7%.

Please refer to FIG. 50 for the values of BFL, Gaa, ALT, EFL/TTL, T4/T6, BFL/T3, BFL/T6, TTL/T3, T4/G34, T5/G34, ALT/T6, TTL/T6, Gaa/T3, T1/T3, Gaa/T6, T1/T6, BFL/G34, ALT/G34, TTL/G34, Gaa/G34, ALT/T3, ALT/T1 and TTL/T1 of the present embodiment.

In comparison with the first embodiment, the second embodiment may include decreased values related to at least one of the following: longitudinal spherical aberration, astigmatism aberration in the sagittal and tangential directions, and HFOV. Further, the second embodiment may be manufactured more easily and the yield rate may be higher when compared to the first embodiment.

Figure 14:
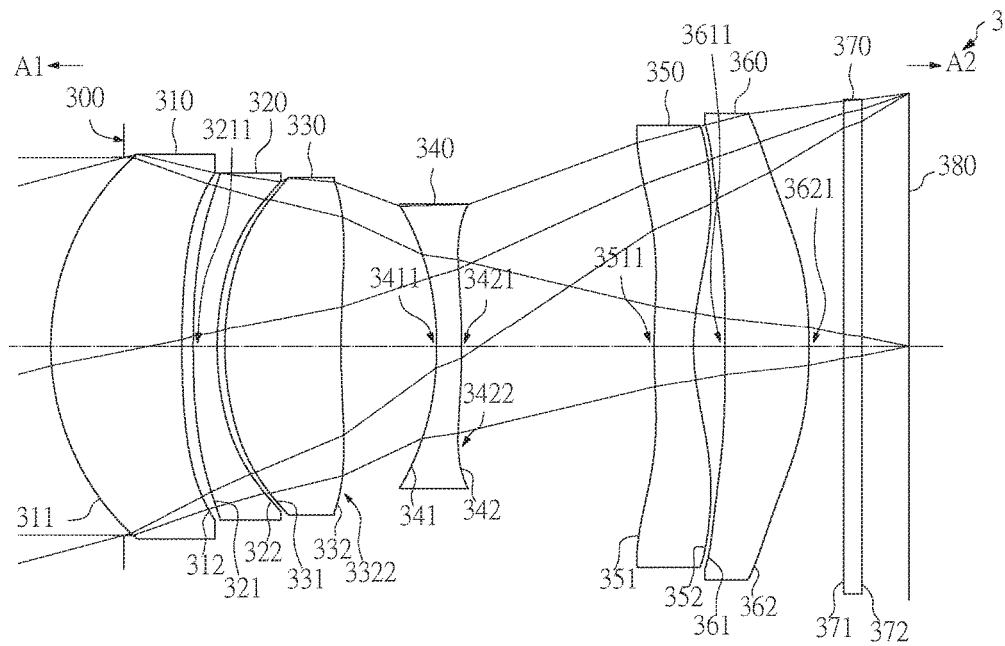
FIG. 14 depicts a cross-sectional view of a third embodiment of an optical imaging lens having six lens elements according to the present disclosure.
Figure 15:
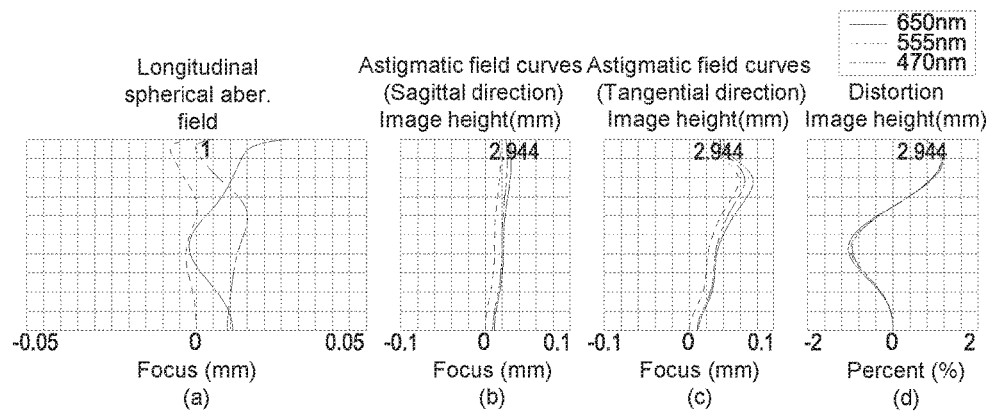
FIG. 15 depicts a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having six lens elements according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise an aperture stop 300, a first lens element 310, a second lens element 320, a third lens element 330, a fourth lens element 340, a fifth lens element 350 and a sixth lens element 360.

The arrangement of the convex or concave surface structures, including the object-side surfaces 311 and 331 and the image-side surfaces 312, 322, and 352 are generally similar with the optical imaging lens 1. The differences between the optical imaging lens 1 and the optical imaging lens 3 may include the concave/convex shapes of at least one of the following: the object-side surfaces 321, 341, 351, and 361, and the image-side surface 332, 342, and 362. Additional differences may include the refracting power, a radius of curvature, a thickness, an aspherical data, and an effective focal length of each lens element. More specifically, the object-side surface 321 may comprise a convex portion 3211 in a vicinity of the optical axis, the image-side surface 332 may comprise a convex portion 3322 in a vicinity of a periphery of the third lens element 330, the object-side surface 341 may comprise a concave portion 3411 in a vicinity of the optical axis, the image-side surface 342 may comprise a convex portion 3421 in a vicinity of the optical axis and a concave portion 3422 in a vicinity of a periphery of the fourth lens element 340, the object-side surface 351 may comprise a convex portion 3511 in a vicinity of the optical axis, the object-side surface 361 may comprise a convex portion 3611 in a vicinity of the optical axis, the image-side surface 362 may comprises a convex portion 3621 in a vicinity of the optical axis, the fourth lens element 340 may have negative refracting power, and the sixth lens element 360 may comprise positive refracting power.

Here, for clearly showing the drawings of the present embodiment, only the surface shapes which are different from that in the first embodiment are labeled. Please refer to FIG. 16 for the optical characteristics of each lens element in the optical imaging lens 3 of the present embodiment.

From the vertical deviation of each curve shown in FIG. 15 part a, the offset of the off-axis light relative to the image point may be within about ±0.03 mm. Referring to FIG. 15 part b, the focus variation with respect to the three different wavelengths (470 nm, 555 nm, 650 nm) in the whole field may fall within about ±0.04 mm. Referring to FIG. 15 part c, the focus variation with respect to the three different wavelengths (470 nm, 555 nm, 650 nm) in the whole field may fall within about ±0.08 mm. Refer to FIG. 15 part d, the variation of the distortion aberration of the optical imaging lens 3 may be within about ±1.2%.

Please refer to FIG. 50 for the values of BFL, Gaa, ALT, EFL/TTL, T4/T6, BFL/T3, BFL/T6, TTL/T3, T4/G34, T5/G34, ALT/T6, TTL/T6, Gaa/T3, T1/T3, Gaa/T6, T1/T6, BFL/G34, ALT/G34, TTL/G34, Gaa/G34, ALT/T3, ALT/T1 and TTL/T1 of the present embodiment.

In comparison with the first embodiment, the third embodiment may include decreased values related to at least one of the following: longitudinal spherical aberration, astigmatism aberration in the sagittal and tangential directions, and HFOV. Also, the third embodiment may further feature improved image quality in comparison with the first embodiment. Moreover, the third embodiment may be manufactured more easily and its yield rate may be higher when compared to the first embodiment.

Figure 18:
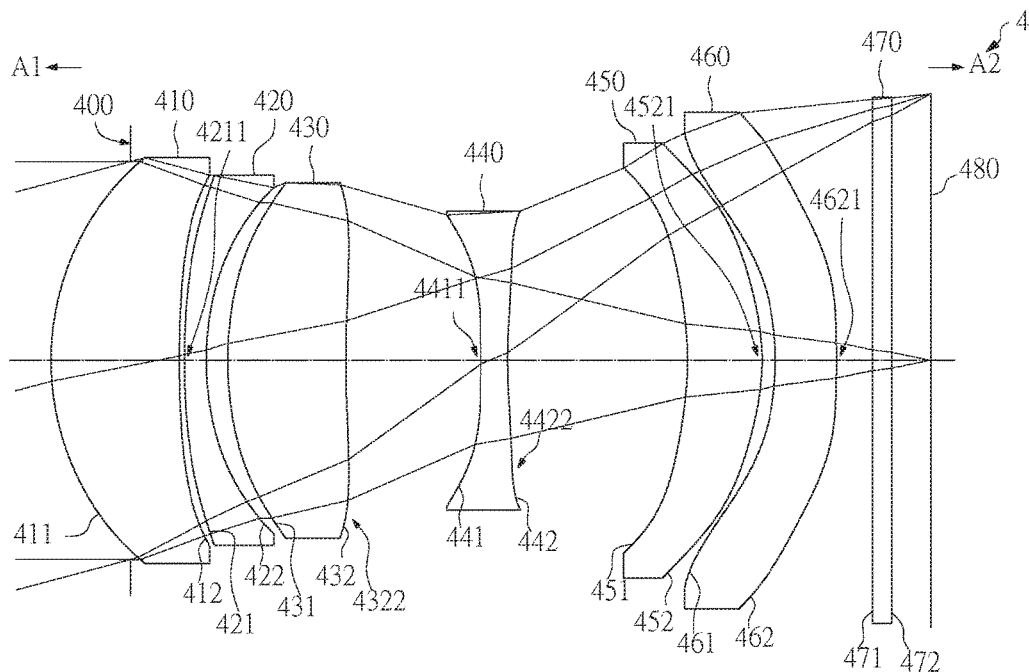
FIG. 18 depicts a cross-sectional view of a fourth embodiment of an optical imaging lens having six lens elements according to the present disclosure.
Figure 19:
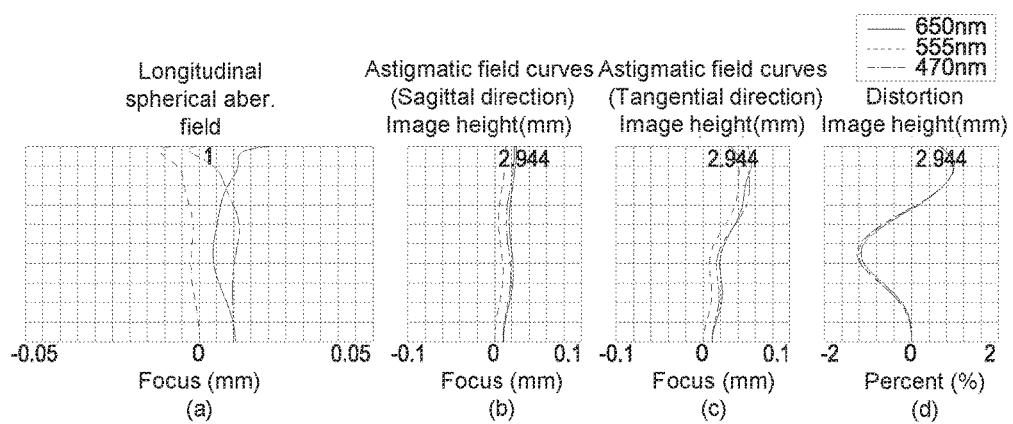
FIG. 19 depicts a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having six lens elements according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise an aperture stop 400, a first lens element 410, a second lens element 420, a third lens element 430, a fourth lens element 440, a fifth lens element 450 and a sixth lens element 460.

The arrangement of the convex or concave surface structures, including the object-side surfaces 411, 431, 441, and 461 and the image-side surfaces 412, 422, 442, 452, and 462 are generally similar to the optical imaging lens 1. The differences between the optical imaging lens 1 and the optical imaging lens 4 may include the concave/convex shapes of at least one of the following: the object-side surfaces 421 and 441, and the image-side surfaces 432, 442, 452, and 462. Additional differences may include the refracting power, a radius of curvature, a thickness, an aspherical data, and an effective focal length of each lens element. More specifically, the object-side surface 421 may comprise a convex portion 4211 in a vicinity of the optical axis, the image-side surface 432 may comprise a convex portion 4322 in a vicinity of a periphery of the third lens element 430, the object-side surface 441 may comprise a concave portion 4411 in a vicinity of the optical axis, the image-side surface 442 may comprise a concave portion 4422 in a vicinity of a periphery of the fourth lens element 440, the image-side surface 452 may comprise a convex portion 4521 in a vicinity of the optical axis, the image-side surface 462 may comprise a convex portion 4621 in a vicinity of the optical axis, the fourth lens element 440 may have negative refracting power, and the fifth lens element 450 may have positive refracting power.

Here, for clearly showing the drawings of the present embodiment, only the surface shapes which are different from that in the first embodiment are labeled. Please refer to FIG. 20 for the optical characteristics of each lens elements in the optical imaging lens 4 of the present embodiment.

From the vertical deviation of each curve shown in FIG. 19 part a, the offset of the off-axis light relative to the image point may be within about ±0.02 mm. Referring to FIG. 19 part b, the focus variation with respect to the three different wavelengths (470 nm, 555 nm, 650 nm) in the whole field may fall within about ±0.03 mm. Referring to FIG. 19 part c, the focus variation with respect to the three different wavelengths (470 nm, 555 nm, 650 nm) in the whole field may fall within about ±0.06 mm. Referring to FIG. 19 part d, the variation of the distortion aberration of the optical imaging lens 4 may be within about ±1.4%.

Please refer to FIG. 50 for the values of BFL, Gaa, ALT, EFL/TTL, T4/T6, BFL/T3, BFL/T6, TTL/T3, T4/G34, T5/G34, ALT/T6, TTL/T6, Gaa/T3, T1/T3, Gaa/T6, T1/T6, BFL/G34, ALT/G34, TTL/G34, Gaa/G34, ALT/T3, ALT/T1 and TTL/T1 of the present embodiment.

Additionally, the distance from the object-side surface 411 of the first lens element 410 to the image plane 480 along the optical axis may be about 5.908 mm, EFL may be about 6.141 mm, the image height may be about 2.619 mm, HFOV may be about 22.896 degrees, and Fno may be about 2.29.

In comparison to the first embodiment, the fourth embodiment may include decreased values related to at least one of the following: longitudinal spherical aberration, astigmatism aberration in the sagittal and tangential directions, and HFOV. Also, the fourth embodiment may further feature improved image quality in comparison with the first embodiment. Moreover, the fourth embodiment may be manufactured more easily and its yield rate may be higher when compared to the first embodiment.

Figure 22:
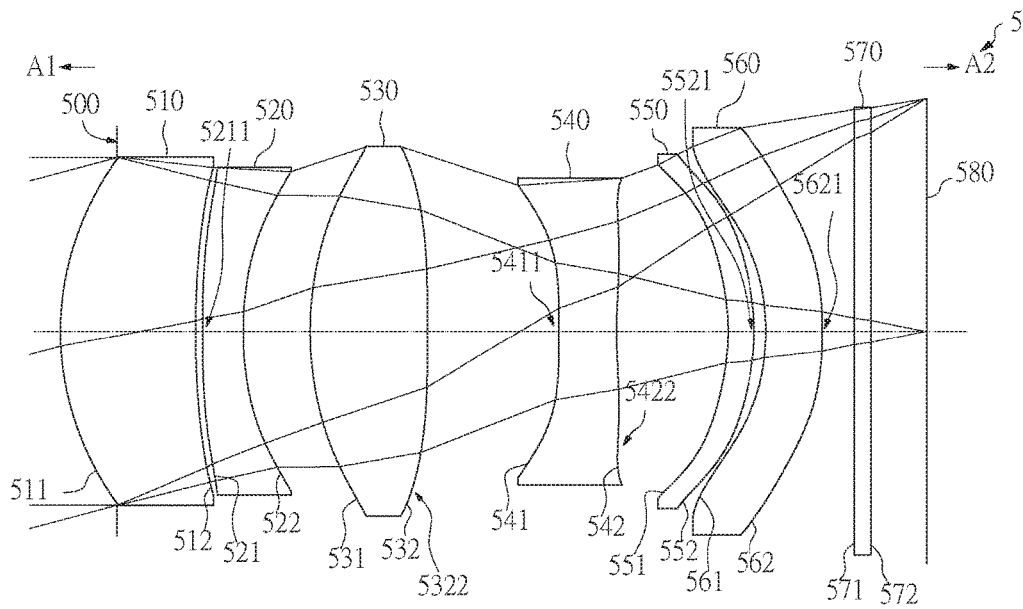
FIG. 22 depicts a cross-sectional view of a fifth embodiment of an optical imaging lens having six lens elements according to the present disclosure.
Figure 23:
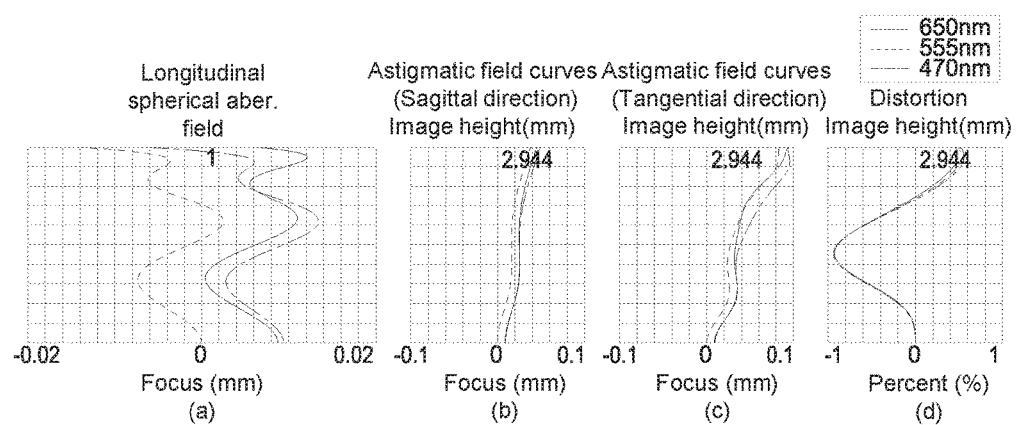
FIG. 23 depicts a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having six lens elements according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise an aperture stop 500, a first lens element 510, a second lens element 520, a third lens element 530, a fourth lens element 540, a fifth lens element 550 and a sixth lens element 560.

The arrangement of the convex or concave surface structures, including the object-side surfaces 511, 531, 551, and 561 and the image-side surfaces 512 and 522 are generally similar to the optical imaging lens 1. The differences between the optical imaging lens 1 and the optical imaging lens 5 may include the concave/convex shapes of at least one of the following: the object-side surfaces 521 and 541, and the image-side surfaces 532, 542, 552 and 562. Additional differences may include the refracting power, a radius of curvature, a thickness, an aspherical data, and an effective focal length of each lens element. More specifically, the object-side surface 521 may comprise a convex portion 5211 in a vicinity of the optical axis, the image image-side surface 532 may comprise a convex portion 5322 in a vicinity of a periphery of the third lens element 530, the object-side surface 541 may comprise a concave portion 5411 in a vicinity of the optical axis, the image-side surface 542 may comprises a concave portion 5422 in a vicinity of a periphery of the fourth lens element 540, the image-side surface 552 may comprise a convex portion 5521 in a vicinity of the optical axis, the image-side surface 562 may comprise a convex portion 5621 in a vicinity of the optical axis, the fourth lens element 540 may have negative refracting power, and the fifth lens element 550 may have positive refracting power.

Here, for clearly showing the drawings of the present embodiment, only the surface shapes which are different from that in the first embodiment are labeled. FIG. 24 depicts the optical characteristics of each lens elements in the optical imaging lens 5 of the present embodiment.

From the vertical deviation of each curve shown in FIG. 23 part a, the offset of the off-axis light relative to the image point may be within about ±0.016 mm. Referring to FIG. 23 part b, the focus variation with respect to the three different wavelengths (470 nm, 555 nm, 650 nm) in the whole field may fall within about ±0.06 mm. Referring to FIG. 23 part c, the focus variation with respect to the three different wavelengths (470 nm, 555 nm, 650 nm) in the whole field may fall within about ±0.1 mm. Referring to FIG. 23 part d, the variation of the distortion aberration of the optical imaging lens 5 may be within about ±1.0%.

Please refer to FIG. 50 for the values of BFL, Gaa, ALT, EFL/TTL, T4/T6, BFL/T3, BFL/T6, TTL/T3, T4/G34, T5/G34, ALT/T6, TTL/T6, Gaa/T3, T1/T3, Gaa/T6, T1/T6, BFL/G34, ALT/G34, TTL/G34, Gaa/G34, ALT/T3, ALT/T1 and TTL/T1 of the present embodiment.

In comparison to the first embodiment, the fifth embodiment may include decreased values related to at least one of the following: longitudinal spherical aberration, astigmatism aberration in the sagittal and tangential directions, and HFOV. Also, the fifth embodiment may further feature improved image quality in comparison with the first embodiment. Moreover, the fifth embodiment may be manufactured more easily and its yield rate may be higher when compared to the first embodiment.

Figure 26:
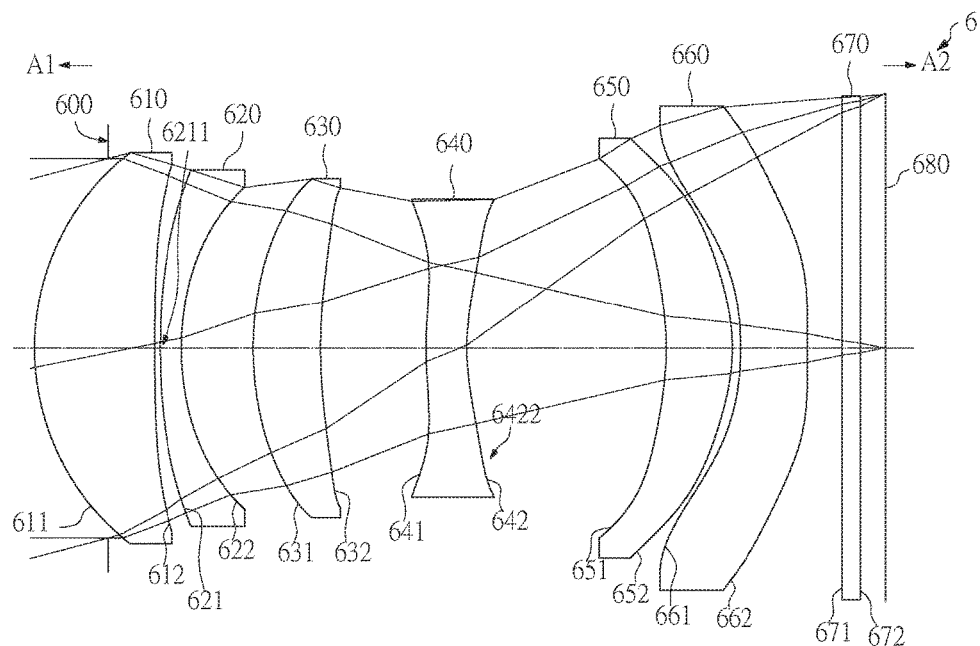
FIG. 26 depicts a cross-sectional view of a sixth embodiment of an optical imaging lens having six lens elements according to the present disclosure.
Figure 27:
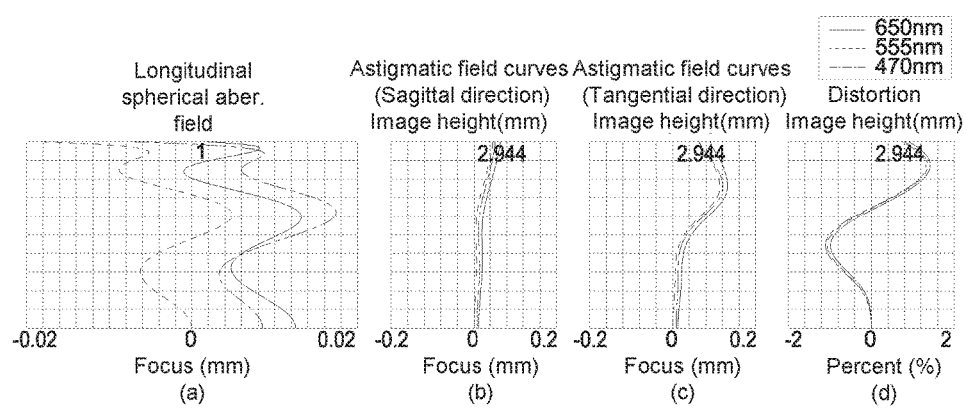
FIG. 27 depicts a chart of longitudinal spherical aberration and other kinds of optical aberrations of a sixth embodiment of the optical imaging lens according to the present disclosure.

Reference is now made to FIGS. 26-29. FIG. 26 illustrates an example cross-sectional view of an optical imaging lens 6 having six lens elements according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise an aperture stop 600, a first lens element 610, a second lens element 620, a third lens element 630, a fourth lens element 640, a fifth lens element 650 and a sixth lens element 660.

The arrangement of the convex or concave surface structures, including the object-side surfaces 611, 631, 641, 651, and 661 and image-side surfaces 612, 622, 632, 652, and 662 are generally similar with the optical imaging lens 1. The differences between the optical imaging lens 1 and the optical imaging lens 6 may include the concave/convex shapes of at least one of the following: the object-side surface 621, and the image-side surface 642. Additional differences may include the refracting power, a radius of curvature, a thickness, an aspherical data, and an effective focal length of each lens element. More specifically, the object-side surface 621 may comprise a convex portion 6211 in a vicinity of the optical axis, the image-side surface 642 may comprise a convex portion 6422 in a vicinity of a periphery of the fourth lens element 640, the fourth lens element 640 may have negative refracting power, and the fifth lens element 650 may have positive refracting power.

Here, for clearly showing the drawings of the present embodiment, only the surface shapes which are different from that in the first embodiment are labeled. Please refer to FIG. 28 for the optical characteristics of each lens elements in the optical imaging lens 6 of the present embodiment.

From the vertical deviation of each curve shown in FIG. 27 part a, the offset of the off-axis light relative to the image point may be within about ±0.02 mm. Referring to FIG. 27 part b, the focus variation with respect to the three different wavelengths (470 nm, 555 nm, 650 nm) in the whole field may fall within about ±0.04 mm. Referring to FIG. 27 part c, the focus variation with respect to the three different wavelengths (470 nm, 555 nm, 650 nm) in the whole field may fall within about ±0.14 mm. Referring to FIG. 27 part d, the variation of the distortion aberration of the optical imaging lens 6 may be within about ±1.4%.

Please refer to FIG. 50 for the values of BFL, Gaa, ALT, EFL/TTL, T4/T6, BFL/T3, BFL/T6, TTL/T3, T4/G34, T5/G34, ALT/T6, TTL/T6, Gaa/T3, T1/T3, Gaa/T6, T1/T6, BFL/G34, ALT/G34, TTL/G34, Gaa/G34, ALT/T3, ALT/T1 and TTL/T1 of the present embodiment.

In comparison with the first embodiment, the sixth embodiment may include decreased values related to at least one of the following: the longitudinal spherical aberration, the astigmatism aberration in the sagittal and tangential directions, and HFOV of the sixth embodiment. Also, the sixth embodiment may further feature improved image quality in comparison with the first embodiment. Moreover, the sixth embodiment may be manufactured more easily and its yield rate may be higher when compared to the first embodiment.

Figure 30:
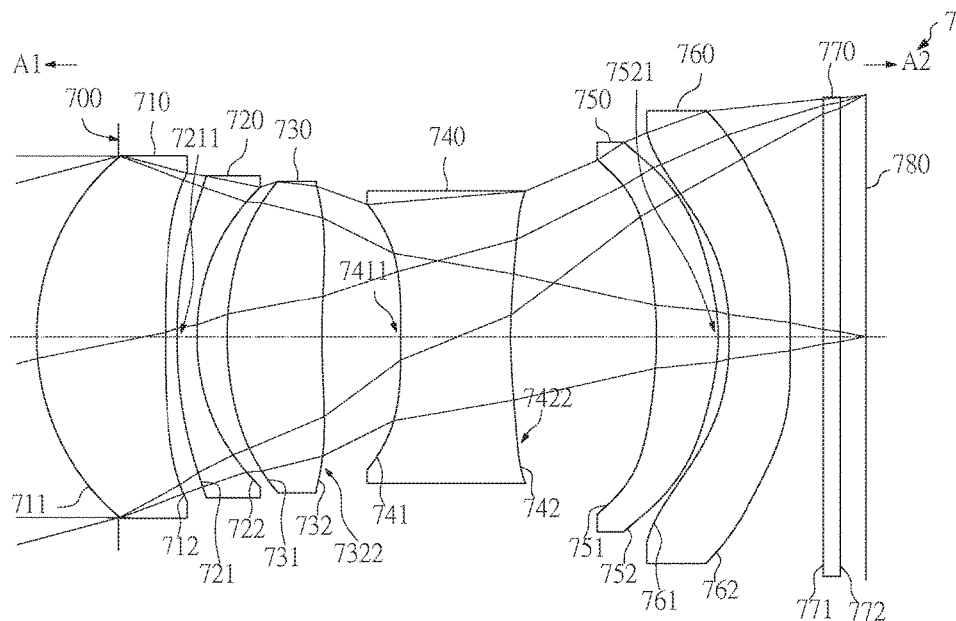
FIG. 30 depicts a cross-sectional view of a seventh embodiment of an optical imaging lens having six lens elements according to the present disclosure.
Figure 31:
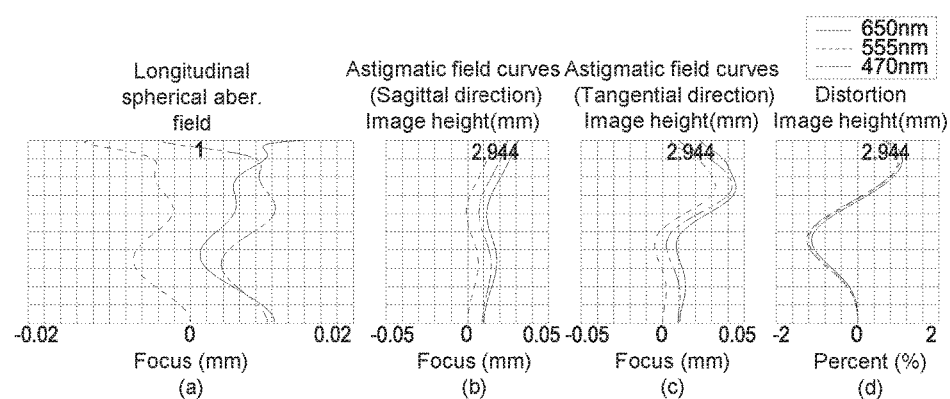
FIG. 31 depicts a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having six lens elements according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise an aperture stop 700, a first lens element 710, a second lens element 720, a third lens element 730, a fourth lens element 740, a fifth lens element 750 and a sixth lens element 760.

The arrangement of the convex or concave surface structures, including the object-side surfaces 711, 731, 751, and 761 and image-side surfaces 712, 722, and 762 are generally similar with the optical imaging lens 1. The differences between the optical imaging lens 1 and the optical imaging lens 7 may include the concave/convex shapes of at least one of the following: the object-side surfaces 721 and 741, and the image-side surfaces 732, 742, and 752. Additional differences may include refracting power, radius of curvature, thickness, aspherical data, and effective focal length of each lens element. More specifically, the object-side surface 721 may comprise a convex portion 7211 in a vicinity of the optical axis, the image-side surface 732 may comprise a convex portion 7322 in a vicinity of a periphery of the third lens element 730, the object-side surface 741 may comprise a concave portion 7411 in a vicinity of the optical axis, the image-side surface 742 may comprise a concave portion 7422 in a vicinity of a periphery of the fourth lens element 740, the image-side surface 752 may comprise a concave portion 7521 in a vicinity of the optical axis, the fourth lens element 740 may have negative refracting power, and the fifth lens element 750 may have positive refracting power.

Here, for clearly showing the drawings of the present embodiment, only the surface shapes which are different from that in the first embodiment are labeled. Please refer to FIG. 32 for the optical characteristics of each lens elements in the optical imaging lens 7 of the present embodiment.

From the vertical deviation of each curve shown in FIG. 31 part a, the offset of the off-axis light relative to the image point may be within ±0.014 mm. Referring to FIG. 31 part b, the focus variation with respect to the three different wavelengths (470 nm, 555 nm, 650 nm) in the whole field falls within ±0.035 mm. Referring to FIG. 31 part c, the focus variation with respect to the three different wavelengths (470 nm, 555 nm, 650 nm) in the whole field falls within ±0.05 mm. Referring to FIG. 31 part d, the variation of the distortion aberration of the optical imaging lens 7 may be within ±1.4%.

Please refer to FIG. 50 for the values of BFL, Gaa, ALT, EFL/TTL, T4/T6, BFL/T3, BFL/T6, TTL/T3, T4/G34, T5/G34, ALT/T6, TTL/T6, Gaa/T3, T1/T3, Gaa/T6, T1/T6, BFL/G34, ALT/G34, TTL/G34, Gaa/G34, ALT/T3, ALT/T1 and TTL/T1 of the present embodiment.

In comparison to the first embodiment, the seventh embodiment may include improved values related to at least one of the following: longitudinal spherical aberration, astigmatism aberration in the sagittal and tangential directions, and HFOV. Moreover, the fourth embodiment may be manufactured more easily and its yield rate may be higher when compared to the first embodiment.

Figure 34:
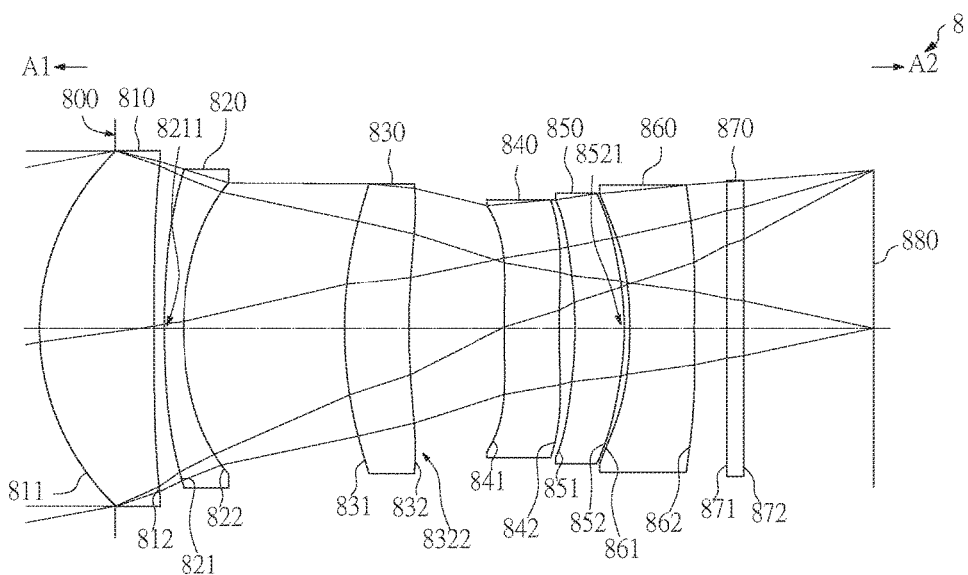
FIG. 34 depicts a cross-sectional view of an eighth embodiment of an optical imaging lens having six lens elements according to the present disclosure.
Figure 35:
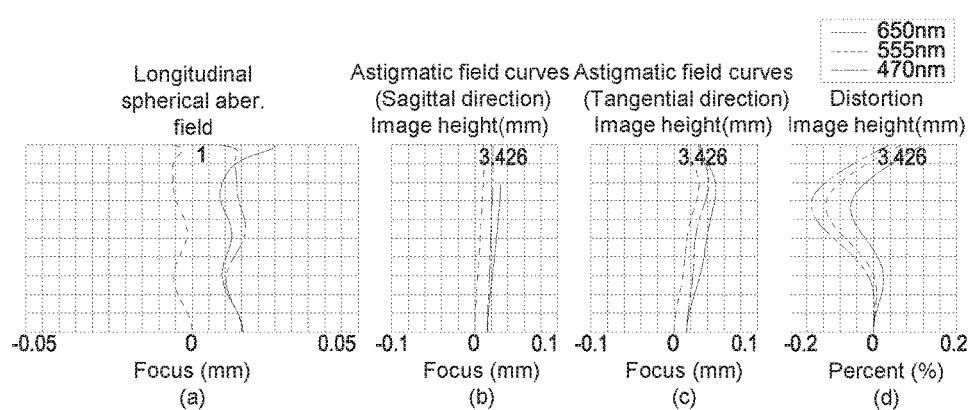
FIG. 35 depicts a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having six lens elements according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise an aperture stop 800, a first lens element 810, a second lens element 820, a third lens element 830, a fourth lens element 840, a fifth lens element 850 and a sixth lens element 860.

The arrangement of the convex or concave surface structures, including the object-side surfaces 811, 831, 841, 851, and 861, and the image-side surfaces 812, 822, 842, and 862 are generally similar with the optical imaging lens 1. The differences between the optical imaging lens 1 and the optical imaging lens 8 may include the concave/convex shapes of at least one of the following: the object-side surface 821, and the image-side surfaces 832 and 852. Additional differences may include the refracting power, a radius of curvature, a thickness, an aspherical data, and an effective focal length of each lens element. More specifically, the object-side surface 821 may comprise a concave portion 8211 in a vicinity of the optical axis, the image-side surface 832 may comprise a convex portion 8322 in a vicinity of a periphery of the third lens element 830, the image-side surface 852 may comprise a convex portion 8521 in a vicinity of the optical axis, the fourth lens element 840 may have negative refracting power, and the fifth lens element 850 may have positive refracting power.

Here, for clearly showing the drawings of the present embodiment, only the surface shapes which are different from that in the first embodiment are labeled. Please refer to FIG. 36 for the optical characteristics of each lens elements in the optical imaging lens 8 of the present embodiment.

From the vertical deviation of each curve shown in FIG. 35 part a, the offset of the off-axis light relative to the image point may be within ±0.025 mm. Referring to FIG. 35 part b, the focus variation with respect to the three different wavelengths (470 nm, 555 nm, 650 nm) in the whole field falls within ±0.025 mm. Referring to FIG. 35 part c, the focus variation with respect to the three different wavelengths (470 nm, 555 nm, 650 nm) in the whole field falls within ±0.05 mm. Referring to FIG. 35 part d, the variation of the distortion aberration of the optical imaging lens 8 may be within ±2.5%.

Please refer to FIG. 50 for the values of BFL, Gaa, ALT, EFL/TTL, T4/T6, BFL/T3, BFL/T6, TTL/T3, T4/G34, T5/G34, ALT/T6, TTL/T6, Gaa/T3, T1/T3, Gaa/T6, T1/T6, BFL/G34, ALT/G34, TTL/G34, Gaa/G34, ALT/T3, ALT/T1 and TTL/T1 of the present embodiment.

In comparison to the first embodiment, the eighth embodiment may include decreased values related to at least one of the following: longitudinal spherical aberration, astigmatism aberration in the sagittal and tangential directions, and HFOV. Also, the eighth embodiment may further feature improved image quality in comparison with the first embodiment. Moreover, the eighth embodiment may be manufactured more easily and its yield rate may be higher when compared to the first embodiment.

Figure 38:
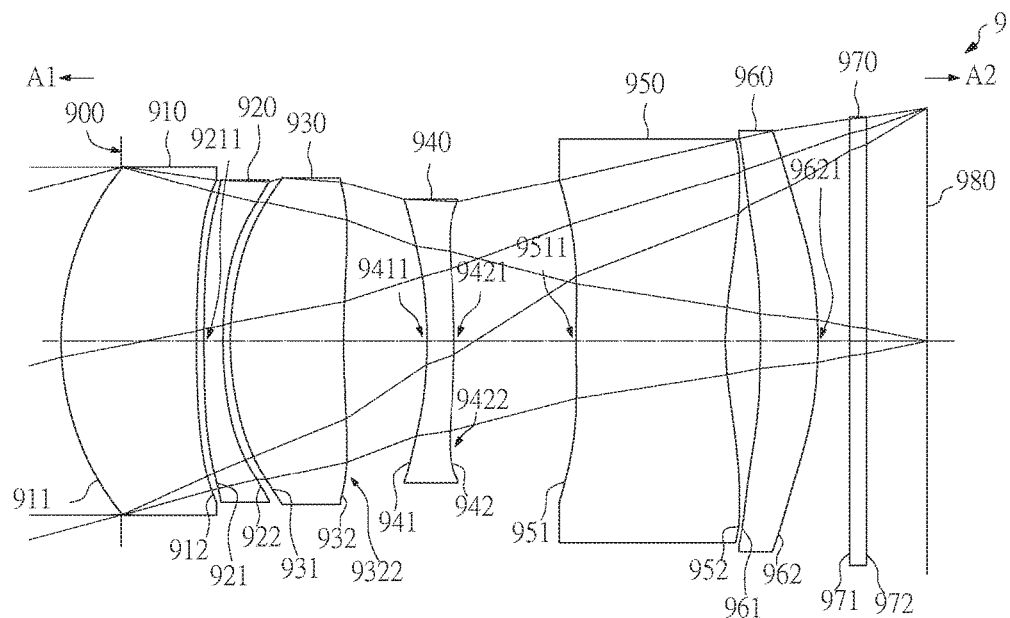
FIG. 38 depicts a cross-sectional view of a ninth embodiment of an optical imaging lens having six lens elements according to the present disclosure.
Figure 39:
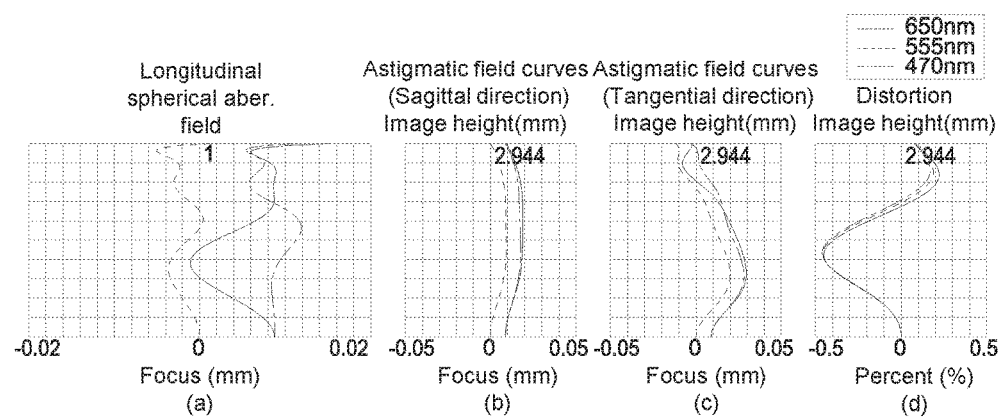
FIG. 39 depicts a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having six lens elements according to a ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, may comprise an aperture stop 900, a first lens element 910, a second lens element 920, a third lens element 930, a fourth lens element 940, a fifth lens element 950 and a sixth lens element 960.

The arrangement of the convex or concave surface structures, including the object-side surfaces 911, 931, and 961, and the image-side surfaces 912, 922, and 952 are generally similar with the optical imaging lens 1. The differences between the optical imaging lens 1 and the optical imaging lens 9 may include the concave/convex shapes of at least one of the following: the object-side surfaces 921, 941, and 951, and the image-side surfaces 932, 942, and 962. Additional differences may include the refracting power, a radius of curvature, a thickness, an aspherical data, and an effective focal length of each lens element. More specifically, the object-side surface 921 may comprise a convex portion 9211 in a vicinity of the optical axis, the image-side surface 932 may comprise a convex portion 9322 in a vicinity of a periphery of the third lens element 930, the object-side surface 941 may comprise a concave portion 9411 in a vicinity of the optical axis, the image-side surface 942 may comprise a convex portion 9421 in a vicinity of the optical axis and a concave portion 9422 in a vicinity of a periphery of the fourth lens element 940, the object-side surface 951 may comprise a convex portion 9511 in a vicinity of the optical axis, the image-side surface 962 may comprise a convex portion 9621 in a vicinity of the optical axis, the fourth lens element 940 may have negative refracting power, and the sixth lens element 960 may have positive refracting power.

Here, for clearly showing the drawings of the present embodiment, only the surface shapes which are different from that in the first embodiment are labeled. Please refer to FIG. 40 for the optical characteristics of each lens elements in the optical imaging lens 9 of the present embodiment.

From the vertical deviation of each curve shown in FIG. 39 part a, the offset of the off-axis light relative to the image point may be within ±0.04 mm. Referring to FIG. 39 part b, the focus variation with respect to the three different wavelengths (470 nm, 555 nm, 650 nm) in the whole field falls within ±0.04 mm. Referring to FIG. 39 part c, the focus variation with respect to the three different wavelengths (470 nm, 555 nm, 650 nm) in the whole field falls within ±0.07 mm. Referring to FIG. 39 part d, the variation of the distortion aberration of the optical imaging lens 9 may be within ±2.5%.

Please refer to FIG. 50 for the values of BFL, Gaa, ALT, EFL/TTL, T4/T6, BFL/T3, BFL/T6, TTL/T3, T4/G34, T5/G34, ALT/T6, TTL/T6, Gaa/T3, T1/T3, Gaa/T6, T1/T6, BFL/G34, ALT/G34, TTL/G34, Gaa/G34, ALT/T3, ALT/T1 and TTL/T1 of the present embodiment.

In comparison with the first embodiment, the ninth embodiment may include decreased values related to at least one of the following: longitudinal spherical aberration, astigmatism aberration in the sagittal and tangential directions, and HFOV. Moreover, the ninth embodiment may be manufactured more easily and its yield rate may be higher when compared to the first embodiment.

Figure 42:
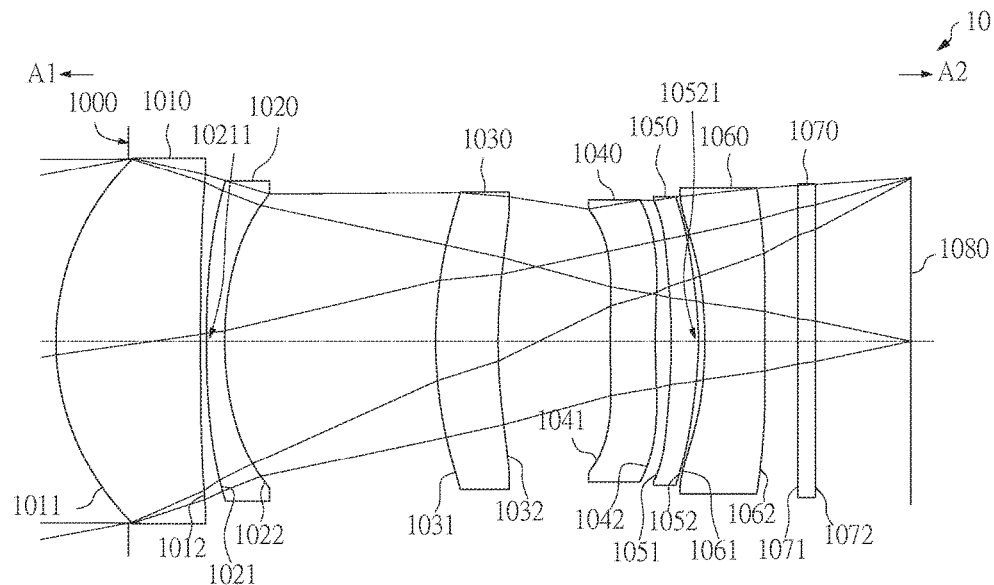
FIG. 42 depicts a cross-sectional view of a tenth embodiment of an optical imaging lens having six lens elements according to the present disclosure.
Figure 43:
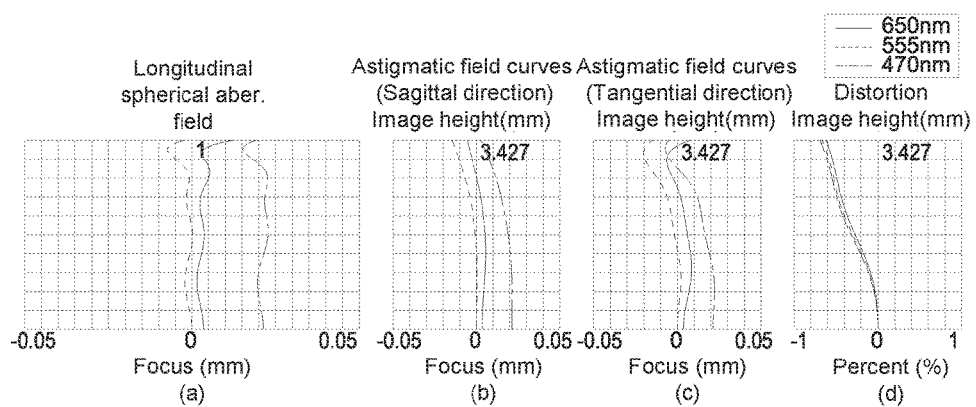
FIG. 43 depicts a chart of longitudinal spherical aberration and other kinds of optical aberrations of a tenth embodiment of the optical imaging lens according to the present disclosure.

Reference is now made to FIGS. 42-45. FIG. 42 illustrates an example cross-sectional view of an optical imaging lens 10 having six lens elements according to a tenth example embodiment. FIG. 43 shows example charts of longitudinal spherical aberration and other kinds of optical aberrations of the optical imaging lens 10 according to the tenth embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 930, reference number 1032 for labeling the image-side surface of the third lens element 1030, etc.

As shown in FIG. 42, the optical imaging lens 10 of the present embodiment, in an order from an object side A1 to an image side A2 along an optical axis, may comprise an aperture stop 1000, a first lens element 1010, a second lens element 1020, a third lens element 1030, a fourth lens element 1040, a fifth lens element 1050 and a sixth lens element 1060.

The arrangement of the convex or concave surface structures, including the object-side surfaces 1011, 1031, 1041, 1051, and 1061, and the image-side surfaces 1012, 1022, 1032, 1042, and 1062 are generally similar with the optical imaging lens 1. The differences between the optical imaging lens 1 and the optical imaging lens 10 may include the concave/convex shapes of at least one of the following: the object-side surface 1021, and the image-side surface 1052. Additional differences may include the refracting power, a radius of curvature, a thickness, an aspherical data, and an effective focal length of each lens element. More specifically, the object-side surface 1021 may comprise a convex portion 10211 in a vicinity of the optical axis, the image-side surface 1052 may comprise a convex portion 10521 in a vicinity of the optical axis, the fourth lens element 1040 may have negative refracting power, and the fifth lens element 1050 may have positive refracting power.

Here, for clearly showing the drawings of the present embodiment, only the surface shapes which are different from that in the first embodiment are labeled. Please refer to FIG. 44 for the optical characteristics of each lens elements in the optical imaging lens 10 of the present embodiment.

From the vertical deviation of each curve shown in FIG. 43 part a, the offset of the off-axis light relative to the image point may be within ±0.025 mm. Referring to FIG. 43 part b, the focus variation with respect to the three different wavelengths (470 nm, 555 nm, 650 nm) in the whole field falls within ±0.025 mm. Referring to FIG. 43 part c, the focus variation with respect to the three different wavelengths (470 nm, 555 nm, 650 nm) in the whole field falls within ±0.025 mm. Referring to FIG. 43 part d, the variation of the distortion aberration of the optical imaging lens 9 may be within ±0.8%.

Please refer to FIG. 50 for the values of BFL, Gaa, ALT, EFL/TTL, T4/T6, BFL/T3, BFL/T6, TTL/T3, T4/G34, T5/G34, ALT/T6, TTL/T6, Gaa/T3, T1/T3, Gaa/T6, T1/T6, BFL/G34, ALT/G34, TTL/G34, Gaa/G34, ALT/T3, ALT/T1 and TTL/T1 of the present embodiment.

In comparison with the first embodiment, the tenth embodiment may include decreased values related to at least one of the following: longitudinal spherical aberration, astigmatism aberration in the tangential direction, and HFOV. Moreover, the tenth embodiment may be manufactured more easily and its yield rate may be higher when compared to the first embodiment.

Figure 46:
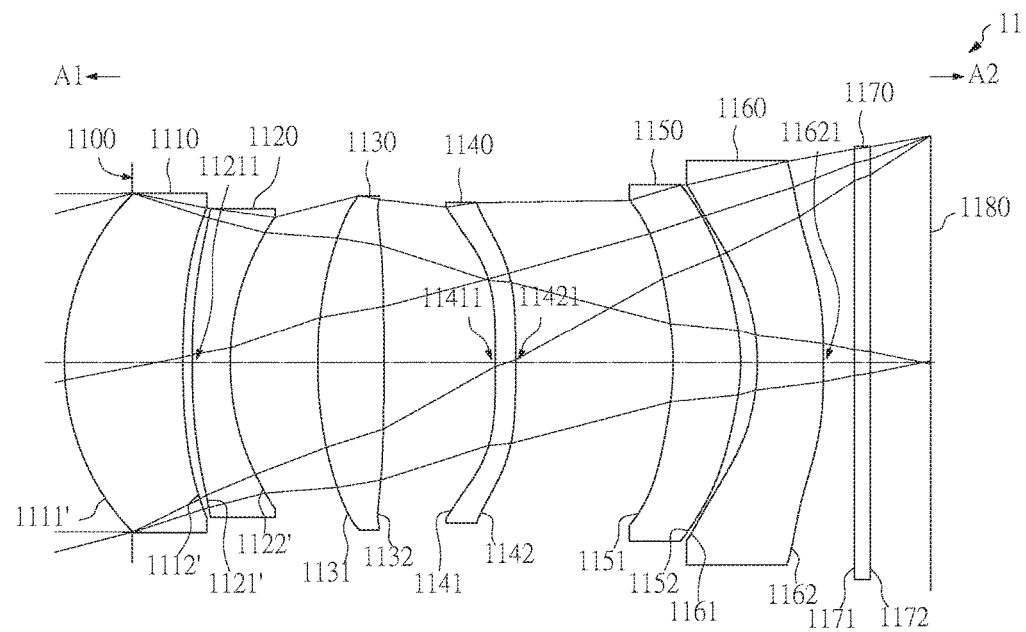
FIG. 46 depicts a cross-sectional view of an eleventh embodiment of an optical imaging lens having six lens elements according to the present disclosure.
Figure 47:
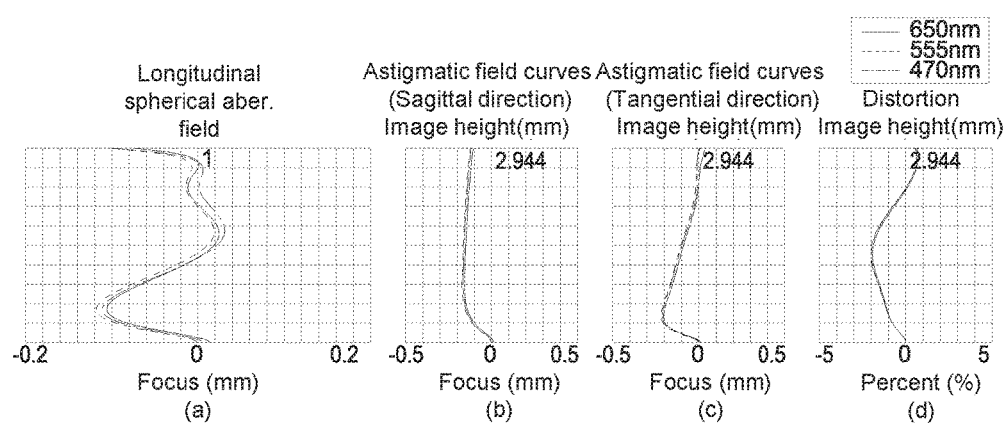
FIG. 47 depicts a chart of longitudinal spherical aberration and other kinds of optical aberrations of an eleventh embodiment of the optical imaging lens according to the present disclosure.

Reference is now made to FIGS. 46-49. FIG. 46 illustrates an example cross-sectional view of an optical imaging lens 11 having six lens elements of the optical imaging lens according to a eleventh example embodiment. FIG. 47 shows example charts of longitudinal spherical aberration and other kinds of optical aberrations of the optical imaging lens 11 according to the eleventh example embodiment. FIG. 48 shows an example table of optical data of each lens element of the optical imaging lens 11 according to the eleventh example embodiment. FIG. 49 shows an example table of aspherical data of the optical imaging lens 11 according to the eleventh example embodiment. The reference numbers labeled in the present embodiment are similar to those in the first embodiment for the similar elements, but here the reference numbers are initialed with 11, for example, reference number 1131 for labeling the object-side surface of the third lens element 1130, reference number 1132 for labeling the image-side surface of the third lens element 1130, etc.

As shown in FIG. 46, the optical imaging lens 11 of the present embodiment, in an order from an object side A1 to an image side A2 along an optical axis, may comprise an aperture stop 1100, a first lens element 1110, a second lens element 1120, a third lens element 1130, a fourth lens element 1140, a fifth lens element 1150 and a sixth lens element 1160.

The arrangement of the convex or concave surface structures, including the object-side surfaces 1111', 1131, 1151, and 1161 and image-side surfaces 1112', 1122', 1132, and 1152 are generally the same as the optical imaging lens 1. The differences between the optical imaging lens 1 and the optical imaging lens 11 may include the concave/convex shapes of at least one of the following: the object-side surfaces 1121' and 1141, and the image-side surfaces 1142, 1162. Additional differences may include the refracting power, a radius of curvature, a refracting power, a thickness, an aspherical data, and an effective focal length of each lens element. More specifically, the object-side surface 1121' may comprise a convex portion 11211 in a vicinity of the optical axis, the object-side surface 1141 may comprise a concave portion 11411 in a vicinity of the optical axis, the image-side surface 1142 may comprise a convex portion 11421 in a vicinity of the optical axis, the image-side surface 1162 may comprise a convex portion 11621 in a vicinity of the optical axis, and the fifth lens element 1150 may have positive refracting power.

Here, for clearly showing the drawings of the present embodiment, only the surface shapes which are different from that in the tenth embodiment are labeled. Please refer to FIG. 48 for the optical characteristics of each lens elements in the optical imaging lens 11 of the present embodiment.

From the vertical deviation of each curve shown in FIG. 47 part a, the offset of the off-axis light relative to the image point may be within about ±0.12 mm. Referring to FIG. 47 part b, the focus variation with respect to the three different wavelengths (470 nm, 555 nm, 650 nm) in the whole field may fall within about ±0.2 mm. Referring to FIG. 47 part c, the focus variation with respect to the three different wavelengths (470 nm, 555 nm, 650 nm) in the whole field may fall within about ±0.25 mm. Referring to FIG. 47 part d, the variation of the distortion aberration of the optical imaging lens 11 may be within about ±2.5%.

Please refer to FIG. 50 for the values of BFL, Gaa, ALT, EFL/TTL, T4/T6, BFL/T3, BFL/T6, TTL/T3, T4/G34, T5/G34, ALT/T6, TTL/T6, Gaa/T3, T1/T3, Gaa/T6, T1/T6, BFL/G34, ALT/G34, TTL/G34, Gaa/G34, ALT/T3, ALT/T1 and TTL/T1 of the present embodiment.

In comparison with the first embodiment, the HFOV of the eleventh embodiment may be smaller. Further, the eleventh embodiment may be manufactured more easily and the yield rate may be higher in comparison with the first embodiment.

Please refer to FIG. FIG. 50 which shows the values of BFL, Gaa, ALT, EFL/TTL, T4/T6, BFL/T3, BFL/T6, TTL/T3, T4/G34, T5/G34, ALT/T6, TTL/T6, Gaa/T3, T1/T3, Gaa/T6, T1/T6, BFL/G34, ALT/G34, TTL/G34, Gaa/G34, ALT/T3, ALT/T1 and TTL/T1 of the first to eleventh embodiments, and it is clear that the optical imaging lenses of the first to eleventh embodiments may satisfy the Equations (1)-(21).

According to above disclosure, the longitudinal spherical aberration, the astigmatism aberration and the variation of the distortion aberration of each embodiment meet the use requirements of various electronic products which implement an optical imaging lens. Moreover, the off-axis light with respect to 470 nm, 555 nm and 650 nm wavelengths may be focused around an image point, and the offset of the off-axis light for each curve relative to the image point may be controlled to effectively inhibit the longitudinal spherical aberration, the astigmatism aberration and the variation of the distortion aberration. Further, as shown by the imaging quality data provided for each embodiment, the distance between the 470 nm, 555 nm and 650 nm wavelengths may indicate that focusing ability and inhibiting ability for dispersion is provided for different wavelengths.

According to above illustration, the optical imaging lens of the present disclosure may provide an effectively shortened optical imaging lens length while maintaining good optical characteristics, by controlling the structure of the lens elements as well as at least one of the inequalities described herein.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising:
   an aperture stop and first, second, third, fourth, fifth and sixth lens elements, each of said first, second, third, fourth, fifth and sixth lens elements having refracting power, an object-side surface facing toward said object side and an image-side surface facing toward said image side, wherein:
      said first lens element has positive refracting power, and said image-side surface of said first lens element comprises a concave portion in a vicinity of a periphery of said first lens element;
      said second lens element has negative refracting power, and said image-side surface of said second lens element comprises a concave portion in a vicinity of a periphery of said second lens element;
      said third lens element has positive refracting power, and the material of said third lens element is plastic;
      the material of said fourth lens element is plastic;
      the material of said fifth lens element is plastic;
      the material of said sixth lens element is plastic;
      one of said fourth, fifth and sixth lens element has positive refracting power and the rest two of said fourth, fifth and sixth lens element has negative refracting power;
      said optical imaging lens comprises no other lenses having refracting power beyond said first, second, third, fourth, fifth and sixth lens elements;
      an effective focal length of said optical imaging lens is represented by EFL, and a distance between said object-side surface of said first lens element and an image plane along the optical axis is represented by TTL, and EFL and TTL satisfy the equations:

EFL/TTL≥1 and TTL≤18 mm.

2. The optical imaging lens according to claim 1, wherein a central thickness of said fourth lens element along the optical axis is represented by T4, and a central thickness of said sixth lens element along the optical axis is represented by T6, and T4 and T6 satisfy the equation: T4/T6≤1.8.

3. The optical imaging lens according to claim 1, wherein a back focal length of said optical imaging lens is represented by BFL, and a central thickness of said third lens element along the optical axis is represented by T3, and BFL and T3 satisfy the equation: BFL/T3≤2.8.

4. The optical imaging lens according to claim 1, wherein a back focal length of said optical imaging lens is represented by BFL, and a central thickness of said sixth lens element along the optical axis is represented by T6, and BFL and T6 satisfy the equation: BFL/T6≤2.8.

5. The optical imaging lens according to claim 1, wherein a central thickness of said third lens element along the optical axis is represented by T3, and TTL and T3 satisfy the equation: TTL/T3≤17.9.

6. The optical imaging lens according to claim 1, wherein a central thickness of said fourth lens element along the optical axis is represented by T4, and an air gap between said third lens element and said fourth lens element along the optical axis is represented by G34, and T4 and G34 satisfy the equation: T4/G34≤1.4.

7. The optical imaging lens according to claim 1, wherein a central thickness of said fifth lens element along the optical axis is represented by T5, and an air gap between said third lens element and said fourth lens element along the optical axis represented by G34, and T5 and G34 satisfy the equation: T5/G34≤1.8.

8. The optical imaging lens according to claim 1, wherein a sum of central thicknesses of said first, second, third, fourth, fifth and sixth lens elements is represented by ALT, and a central thickness of said sixth lens element along the optical axis is represented by T6, and ALT and T6 satisfy the equation: ALT/T6≤9.3.

9. The optical imaging lens according to claim 1, wherein a central thickness of said sixth lens element along the optical axis is represented by T6, and TTL and T6 satisfy the equation: TTL/T6≤17.9.

10. The optical imaging lens according to claim 1, wherein a sum of all air gaps between said first, second, third, fourth, fifth and sixth lens elements along the optical axis is represented by Gaa, and a central thickness of said third lens element along the optical axis is represented by T3, and Gaa and T3 satisfy the equation: Gaa/T3≤5.8.

11. The optical imaging lens according to claim 1, wherein a central thickness of said first lens element along the optical axis is represented by T1, and a central thickness of said third lens element along the optical axis is represented by T3, and T1 and T3 satisfy the equation: T1/T3≤2.4.

12. The optical imaging lens according to claim 1, wherein a sum of all air gaps between said first, second, third, fourth, fifth and sixth lens elements along the optical axis is represented by Gaa, and a central thickness of said sixth lens element along the optical axis is represented by T6, and Gaa and T6 satisfy the equation: Gaa/T6≤5.8.

13. The optical imaging lens according to claim 1, wherein a central thickness of said first lens element along the optical axis is represented by T1, and a central thickness of said sixth lens element along the optical axis is represented by T6, and T1 and T6 satisfy the equation: T1/T6≤2.4.

14. The optical imaging lens according to claim 1, wherein a back focal length of said optical imaging lens is represented by BFL, and an air gap between said third lens element and said fourth lens element along the optical axis is represented by G34, and BFL and G34 satisfy the equation: BFL/G34≤2.2.

15. The optical imaging lens according to claim 1, wherein a sum of central thicknesses of said first, second, third, fourth, fifth and sixth lens elements is represented by ALT, and an air gap between said third lens element and said fourth lens element along the optical axis is represented by G34, and ALT and G34 satisfy the equation: $ALT/G34 \leq 7.3$.

16. The optical imaging lens according to claim 1, wherein an air gap between said third lens element and said fourth lens element along the optical axis is represented by G34, and TTL and G34 satisfy the equation: $TTL/G34 \leq 13.9$.

17. The optical imaging lens according to claim 1, wherein a sum of all air gaps between said first, second, third, fourth, fifth and sixth lens elements along the optical axis is represented by Gaa, and an air gap between said third lens element and said fourth lens element along the optical axis represented is represented by G34, and Gaa and G34 satisfy the equation: $Gaa/G34 \leq 4.5$.

18. The optical imaging lens according to claim 1, wherein a sum of central thicknesses of said first, second, third, fourth, fifth and sixth lens elements is represented by ALT, and a central thickness of said third lens element along the optical axis is represented by T3, and ALT and T3 satisfy the equation: $ALT/T3 \leq 5.7$.

19. The optical imaging lens according to claim 1, wherein a sum of central thicknesses of said first, second, third, fourth, fifth and sixth lens elements is represented by ALT, and a central thickness of said first lens element along the optical axis is represented by T1, and ALT and T1 satisfy the equation: $ALT/T1 \leq 3.7$.

20. The optical imaging lens according to claim 1, wherein a central thickness of said first lens element along the optical axis is represented by T1, and TTL and T1 satisfy the equation: $TTL/T1 \leq 7.3$.

\* \* \* \* \*